US012020335B2

(12) United States Patent
Moetteli

(10) Patent No.: US 12,020,335 B2
(45) Date of Patent: Jun. 25, 2024

(54) NETWORKING ROUNDTABLE CONTROLLER, SYSTEM AND METHOD AND NETWORKING ENGINE

(71) Applicant: John Brent Moetteli, Arbon (CH)

(72) Inventor: John Brent Moetteli, Arbon (CH)

( * ) Notice: Subject to any disclaimer, the term of this patent is extended or adjusted under 35 U.S.C. 154(b) by 1115 days.

(21) Appl. No.: 16/624,958

(22) PCT Filed: Jun. 26, 2018

(86) PCT No.: PCT/US2018/039408
§ 371 (c)(1),
(2) Date: Jun. 24, 2020

(87) PCT Pub. No.: WO2019/005734
PCT Pub. Date: Jan. 3, 2019

(65) Prior Publication Data

US 2020/0219204 A1 Jul. 9, 2020

Related U.S. Application Data

(60) Provisional application No. 62/524,658, filed on Jun. 26, 2017, provisional application No. 62/528,464, (Continued)

(51) Int. Cl.
*G06Q 50/00* (2024.01)
*A47B 57/00* (2006.01)

(Continued)

(52) U.S. Cl.
CPC ............ *G06Q 50/01* (2013.01); *A47B 83/02* (2013.01); *A47F 10/00* (2013.01); *G06Q 50/10* (2013.01);

(Continued)

(58) Field of Classification Search
CPC ............... A47B 83/02; A47B 22/0079; A47B 2200/0079; A47F 10/00; G06Q 50/10; G06Q 50/30

(Continued)

(56) References Cited

U.S. PATENT DOCUMENTS 4,237,796 A 12/1980 Baker et al.
5,716,026 A * 2/1998 Pascasio ............... B64D 11/00 244/118.6

(Continued)

FOREIGN PATENT DOCUMENTS

CN 202941681 U 5/2013
CN 203353977 U 12/2013

(Continued)

OTHER PUBLICATIONS

GB2503926 (Year: 2014).*

(Continued)

*Primary Examiner* — Gene O Crawford
*Assistant Examiner* — Lester Rushin, III
(74) *Attorney, Agent, or Firm* — Da Vinci Partners LLC; John Moetteli

(57) ABSTRACT

A disposition system and method uses software and/or hardware tools to bring persons sharing common interests face to face. In one aspect, a system is used which includes disposition devices such as seating or standing supports and/or counter/table arrangements. The system is adapted to dispose at least three persons in which a guiding system guides relative movement of at least one person of the at least three persons to place the at least one person so as to successively face one of the at least two remaining persons for a desired time period. The system facilitates networking in a manner which reduces awkward situations and provides discipline and efficiency in facilitating contact with a plu- (Continued)

rality of users. A controller controls the disposition for improved networking, including considering occupancy on the disposition devices. In another aspect, the system is an app operating on a smartphone which may or may not use the seating system of the invention. In addition, the invention creates communities and provides effective and efficient means of connecting with others.

21 Claims, 28 Drawing Sheets

Related U.S. Application Data filed on Jul. 4, 2017, provisional application No. 62/628,801, filed on Feb. 9, 2018, provisional application No. 62/668,318, filed on May 8, 2018, provisional application No. 62/671,441, filed on May 15, 2018.

(51) Int. Cl.

| | |
|---|---|
| ***A47B 83/02*** | (2006.01) |
| ***A47F 10/00*** | (2006.01) |
| ***G06Q 50/10*** | (2012.01) |
| ***G06Q 50/40*** | (2024.01) |

(52) U.S. Cl.
CPC ...... *G06Q 50/40* (2024.01); *A47B 2200/0079* (2013.01)

(58) Field of Classification Search
USPC .......................................................... 198/322
See application file for complete search history.

(56) References Cited

U.S. PATENT DOCUMENTS

| | | | | |
|---|---|---|---|---|
| 6,964,370 | B1 | 11/2005 | Hagale et al. | |
| 8,616,628 | B2 * | 12/2013 | Beauchamp | A47B 13/088 297/157.1 |
| 9,456,685 | B2 * | 10/2016 | Wade-Smith | A47B 13/088 |
| 10,889,449 | B2 * | 1/2021 | Umeyama | B65G 43/08 |
| 2002/0167486 | A1 | 11/2002 | Tan et al. | |
| 2008/0228875 | A1 | 9/2008 | Cohen | |
| 2011/0050442 | A1 | 3/2011 | Hefferon | |
| 2013/0010053 | A1 | 1/2013 | Daddi | |
| 2014/0040368 | A1 | 2/2014 | Janssens | |
| 2014/0372290 | A1 | 12/2014 | Kaef et al. | |
| 2015/0172227 | A1 | 6/2015 | Grove, II | |
| 2020/0121526 | A1 * | 4/2020 | Cooper | A61G 5/1075 |
| 2020/0219204 | A1 * | 7/2020 | Moetteli | G06Q 50/10 |

FOREIGN PATENT DOCUMENTS

| | | | |
|---|---|---|---|
| CN | 104856469 | A | 8/2015 |
| CN | 105832049 | A | 3/2016 |
| CN | 204427273 | U | 7/2016 |
| EP | 2709043 | A1 | 3/2014 |
| KR | 200222266 | | 5/2001 |
| KR | 1020040075133 | | 8/2004 |
| KR | 20100115943 | A | 10/2010 |
| KR | 101274362 | | 6/2013 |
| WO | 2007/131381 | A1 | 11/2007 |
| WO | 2012/163801 | A1 | 12/2012 |

OTHER PUBLICATIONS

AU8238198 (Year: 1999).*
International Search Report, International Patent Application No. PCT/US2018/039408, Nov. 22, 2018.

* cited by examiner

View Z

8 Persons → 28 unique pairings possible

Formula: 8 Persons × 7 = 56 / 2 = 28 possible

| | | | | | | | |
|---|---|---|---|---|---|---|---|
| 8 - 1, | 8 - 2, | 8 - 3, | 8 - 4, | 8 - 5, | 8 - 6, | 8 - 7, | ~~8 - 8~~ |
| 7 - 1, | 7 - 2, | 7 - 3, | 7 - 4, | 7 - 5, | 7 - 6, | ~~7 - 7~~, | ~~7 - 8~~ |
| 6 - 1, | 6 - 2, | 6 - 3, | 6 - 4, | 6 - 5, | ~~6 - 6~~, | ~~6 - 7~~, | ~~6 - 8~~ |
| 5 - 1, | 5 - 2, | 5 - 3, | 5 - 4, | ~~5 - 5~~, | ~~5 - 6~~, | ~~5 - 7~~, | ~~5 - 8~~ |
| 4 - 1, | 4 - 2, | 4 - 3, | ~~4 - 4~~, | ~~4 - 5~~, | ~~4 - 6~~, | ~~4 - 7~~, | ~~4 - 8~~ |
| 3 - 1, | 3 - 2, | ~~3 - 3~~, | ~~3 - 4~~, | ~~3 - 5~~, | ~~3 - 6~~, | ~~3 - 7~~, | ~~3 - 8~~ |
| 2 - 1, | ~~2 - 2~~, | ~~2 - 3~~, | ~~2 - 4~~, | ~~2 - 5~~, | ~~2 - 6~~, | ~~2 - 7~~, | ~~2 - 8~~ |
| ~~1 - 1~~, | ~~1 - 2~~, | ~~1 - 3~~, | ~~1 - 4~~, | ~~1 - 5~~, | ~~1 - 6~~, | ~~1 - 7~~, | ~~1 - 8~~ |

| Code convention (if any) | Characteristics | User A | User B | User C |
|---|---|---|---|---|
| -- | handle | Bob242 | Sally300 | Tim22 |
| A-J | Age range | **40-50** | **40-50** | 30-40 |
| 1-12 | Sign (zodiac) | Leo | *Aquarius* | *Aquarius* |
| M, F | sex | M | F | M |
| S + 0-9 | Sexual preference | S1 | S1 | S2 |
| 0-9 | Educational level | Post grad | Post grad | Highschool |
| 0-9 | Race | 1 | 1 | 2 |
| 0-9 | Profession | Attorney | Doctor | salesman |
| -- | Birthday | August 23 | February 14 | Jan 31 |
| Last two numbers | Birth year | 1975 | 1972 | 1982 |
| H + 0-99 | skiing | y | y | n |
| H + 0-99 | hiking | y | Y | n |
| -- | Freestyle comments | I love skiing | Skiing annoys some people but not me | Gaming rocks! |

Community or sub-community code for user A and user B is H233, where H23 is th code for interest in skiing, followed by 33, which indicates that there is also an interest in hiking. If further followed by another code, like S1, then this would indicate a particular sexual orientation.

FIG.31

User A Profile & preferences

Name: Robert J. Smith

3200

3202

| **Sharing (on/off)** | **Characteristics** | **User A** | **Preferences** |
|---|---|---|---|
| on | handle | Bob242 | Sally300 |
| on | Age range | 40-50 | C |
| on | Sign (zodiac) | Leo | -- |
| off | sex | M | F |
| on | Sexual preference | S1 | S1 |
| on | Educational level | Post grad | Post grad |
| off | Race | 1 | -- |
| off | Profession | Attorney | -- |
| on | Birthday | August 23 | -- |
| off | Birth year | 1975 | -- |
| on | skiing | **y** | **H23** |
| on | hiking | **y** | **H33** |
| -- | Freestyle comments | I love skiing | |

!Robert is therefore a member of the C8H2333S1 community, but also a membet of the larger C, C8, H33 and S1 communities, and combinations thereof. C standing for age, 8 for education level, H2333 for interest in both hiking and skiing, and S1, for his sexual preference. He's a memeber of these communities because he has turned sharing of this information with others having similar or complementary characteristics "on".

FIG.32

SPONSOR MODULE

| Communities or sub-communities | Associated theme | Number of members | Number of upcoming meetings over a period | Total number of RSVPs | % of RSVPs that can be expexted to show up |
|---|---|---|---|---|---|
| H23 | skiing | 26,231 | 37 | 382 | 60 |
| H23 | Hiking | 41,189 | 21 | 289 | 55 |

Bidding (bidding can be made in $ and/or with stated value of prizes offered to users for event performance)

3302

FIG.33

Welcome to the Recommendation Contact Engine Interface!

Manage permissions

Manage preferences

Explore communities

Search users

My meetings

3400

FIG.34A

NETWORKING ROUNDTABLE CONTROLLER, SYSTEM AND METHOD AND NETWORKING ENGINE

CROSS REFERENCE TO RELATED APPLICATIONS

This application is the National Stage of International Application No. PCT/US2018/039408, filed Jun. 26, 2018, which claims benefit under 35 USC § 119(a), to U.S. provisional patent application Ser. No. 62/524,658, filed Jun. 26, 2017, U.S. provisional patent application Ser. No. 62/528,464, filed Jul. 4, 2017, U.S. provisional patent application Ser. No. 62/628,801, filed Feb. 9, 2018, U.S. provisional patent application Ser. No. 62/668,318, filed May 8, 2018, and U.S. provisional patent application Ser. No. 62/671,441, filed May 15, 2018.

COPYRIGHT & LEGAL NOTICE

A portion of the disclosure of this patent document contains material which is subject to copyright protection. The Applicant has no objection to the facsimile reproduction by anyone of the patent document or the patent disclosure as it appears in the Patent and Trademark Office patent file or records, but otherwise reserves all copyright rights whatsoever. Further, no references to third party patents or articles made herein is to be construed as an admission that the present invention is not entitled to antedate such material by virtue of prior invention.

BACKGROUND OF THE INVENTION

This invention relates to means of making contact with other individuals (sometimes herein called "users" or "members") using software, typically a social media networking system such as Facebook™ or an online community service system, and/or dedicated hardware. In addition, the invention relates to systems and methods for enabling connection with one or more members having similar preferences by providing a more efficient and effective means of making connections, as well as creating communities.

Social networking sites are varied. They can incorporate a range of new information and communication tools, operating on desktops and on laptops, on mobile devices such as tablet computers and smartphones. They may feature digital photo/video/sharing and "web logging" diary entries online (blogging). Online community services are sometimes considered social-network services, though in a broader sense, a social-network service usually provides an individual-centered service whereas online community services are group-centered. Defined as "websites that facilitate the building of a network of contacts in order to exchange various types of content online," social networking sites provide a space for interaction to continue beyond in person interactions. These computer mediated interactions link members of various networks and may help to both maintain and develop new social ties. Social networking sites allow users to share ideas, digital photos and videos, posts, and to inform others about online or real-world activities and events with people in their network. While in-person social networking—folk dancing, community social events and gathering in a village market to talk about events—has existed since the earliest development of towns, the Web enables people to connect with others who live in different locations, ranging from across a city to across the world. Depending on the social media platform, members may be able to contact any other member. In other cases, members can contact anyone they have a connection to, and subsequently anyone that contact has a connection to, and so on. The success of social networking services can be seen in their dominance in society today, with Facebook having a massive 2.13 billion active monthly users and an average of 1.4 billion daily active users in 2017. LinkedIn™, a career-oriented social-networking service, generally requires that a member personally know another member in real life before they contact them online. Some services require members to have a preexisting connection to contact other members. Such services and systems have provided users with an unprecedented way of making contacts. However, such systems provide little or nothing to facilitate face to face contact or to make such contact more likely to create lasting relationships.

Hardware used in such social networking has typically been computer devices, tables and chairs, and dance floors. Seating exists which facilitates contact with others. Round tables exist which place persons opposite to each other in a facing relationship. Lazy Susans exist for placement at the center of the table to facilitate the selection of food or condiment items for use on food. However, once seated, changing the seating relationship requires getting up, convincing some else to get up and to change seats. This creates an awkward and comfortable and sometimes impolite situation which is to be avoided to conform to accepted social etiquette.

U.S. Pat. No. 9,830,562, the content of which is incorporated herein by reference thereto and relied upon, describes a system and method for mobile social networking within a target area The method includes receiving a social networking profile within a target area. The social networking profile has at least one user preference. The method also includes broadcasting the social networking profile to one or more members of the social network within the target area. The method further includes searching within the target area for the one or more members having a preference that is the same or similar to the at least one user preference. The system and method additionally includes enabling contact with the one or more members having the same or similar user preference. This system and method does not, however, create communities of similar or complementary interests or provide any specific means of connecting with others face to face. Neither does it provide a means of communicating what two engaging users may share in common during the engagement.

Speed dating or speed networking is known, in which groups of males or females, encoded with numbers, nicknames or handles, typically numbering up to ten, sit around a conventional table with members of one interest, e.g., the opposite sex, facing them, and, with the help of a moderator, are asked to begin conversations limited to 3 to 8 minutes. After this period, they are asked by the moderator to move from one seat to another so as to face another participant and to begin another conversation of limited time. They are typically forbidden from sharing their contact information but instead, may share a handle, or number. After the event, the participants indicate which persons they would like to meet again. Such face to face contact is significantly more efficient than online dating or online networking. According to the New York Times, participants in speed dating, for example, experience an average of 2 in 10 or 3 in 10 matches whereas online dating participants only find a compatible match with 1 in 100 or fewer of the profiles they study. As reported by the BBC, in the Science of Love, it takes only between 90 seconds and 4 minutes of face to face interaction to determine attraction, which gives speed dating a significant advantage over online dating. Nevertheless, the moderator must deal with persons who are shy, who are monopolizing or pushy, in an attempt to provide an egalitarian opportunity of contact between the participants. In addition, the participants must be coaxed to move from one seat to another. Where human nature gets involved, some participants monopolize others and others are slow to change seats and make another contact.

As mentioned above, other forms of human contact methods exist. Traditionally, folk dancing to songs of a set time was a means used for people to make face to face contact, even short conversation, with one another in an egalitarian environment, in which roughly equal time is spent with each individual during the course of the song. Today, rather than engaging in these useful networking activities, the music is loud, the room is dark and the dancing style is free, not conducive to equalitarian contact and impossible to carry on any kind of a conversation.

In addition, traditionally, people tended to living and work in the same location, not wandering too far from home when travelling. This was conducive to the development of more intimate relationships, where a mutual friend or family member who knows two persons very wall was able to put them in contact while mentioning at least one point that they had in common. Today, work and home is geographically distant from one another. Mutual friends are rare, particularly mutual friends that can put persons in contact with the aid of a mention of a point of common interest. Still further, church attendance is generally down, thereby reducing a reliable source of mutual friends that can put people together.

What is needed is a system or method that overcomes these drawbacks of modern society. Specially, what is needed is a system and method that fills our modern world's void left by the fading practice of traditional folk dance. Still further, what is needed is a system and method that makes speed dating or speed networking more efficient and less dependent on the human factor.

SUMMARY OF THE INVENTION

An online social networking system and method of the invention uses software and/or dedicated hardware tools to bring persons sharing common interests into engagement, preferably face to face. The online social networking system includes personal computing devices connected in a network comprising a server or servers hosting dedicated control software of which method steps are executed by a processor so as to access a database of user profile data of users in order to operate the said social networking system, The system, during a registration step, provides the users an opt-in, permission and/or preferences selection device such as a drop-down menu, enabling users to provide permission (a) to have a recommendation contact engine compare and share their user data such as user characteristics and preferences with those of other users for which matches on the compared and sharable user data are determined, and (b) based on matching criteria, to be contacted via the recommendation contact engine.

The system is adapted to contact users identified by the recommendation contact engine as having common interests and invite such users to a meeting. The system is further adapted to propose times and/or locations for such suggested meetings, and to register user-indicated-suitable-dates for such meeting. Once an engagement such as a virtual or physical face to face meeting between two recommended users is commenced, the system is adapted to provide engaging users with a user communication device such as a display adapted to indicate to the users what the matching user characteristics are, thereby facilitating identification of common interests between users during an engagement between users.

In one aspect, a system is used which includes disposition devices such as seating or standing supports and/or counter/table arrangements. The system is adapted to dispose at least three persons in which a guiding system guides relative movement of at least one person of the at least three persons to place the at least one person so as to successively face one of the at least two remaining persons for a desired time period (typically 3 to 8 minutes). The system facilitates networking in a manner which reduces awkward situations and provides discipline and efficiency in facilitating contact with a plurality of individuals. A controller controls the disposition for improved networking, including considering occupancy on the disposition devices. In another aspect, the system is an app operating on a smartphone which may or may not use the seating system of the invention. In addition, the invention creates communities and provides effective and efficient means of connecting with others.

An object of the invention is to facilitate networking in a manner which reduces awkward situations and provides discipline and efficiency in facilitating contact with a plurality of individual.

An object of the invention is to fill the technological gap which exists between, for example, currently known social enterprises such as STARBUCKS® and FACEBOOK®.

BRIEF DESCRIPTION OF THE DRAWINGS

FIG. 31 is a schematic view of database inputs and keys to the invention.

FIG. 32 is a graphical representation of the community-making engine of the invention.

FIG. 33 is a sponsor module of the invention.

FIGS. 34A-34B are interfaces of the recommendation contact engine of the invention.

Those skilled in the art will appreciate that elements in the Figures are illustrated for simplicity and clarity and have not necessarily been drawn to scale. For example, dimensions may be exaggerated relative to other elements to help improve understanding of the invention and its embodiments. Furthermore, when the terms 'first', 'second', and the like are used herein, their use is intended for distinguishing between similar elements and not necessarily for describing a sequential or chronological order. Moreover, relative terms like 'front', 'back', 'top' and 'bottom', and the like in the Description and/or in the claims are not necessarily used for describing exclusive relative position. Those skilled in the art will therefore understand that such terms may be interchangeable with other terms, and that the embodiments described herein are capable of operating in other orientations than those explicitly illustrated or otherwise described.

DETAILED DESCRIPTION OF THE PREFERRED EMBODIMENT

The following description is not intended to limit the scope of the invention in any way as they are exemplary in nature, serving to describe the best mode of the invention known to the inventor as of the filing date hereof. Consequently, changes may be made in the arrangement and/or function of any of the elements described in the exemplary embodiments disclosed herein without departing from the spirit and scope of the invention. It should be appreciated that the particular implementations shown and herein described are representative of the invention and its best mode and are not intended to limit the scope of the present invention in any way.

Figure 1A:
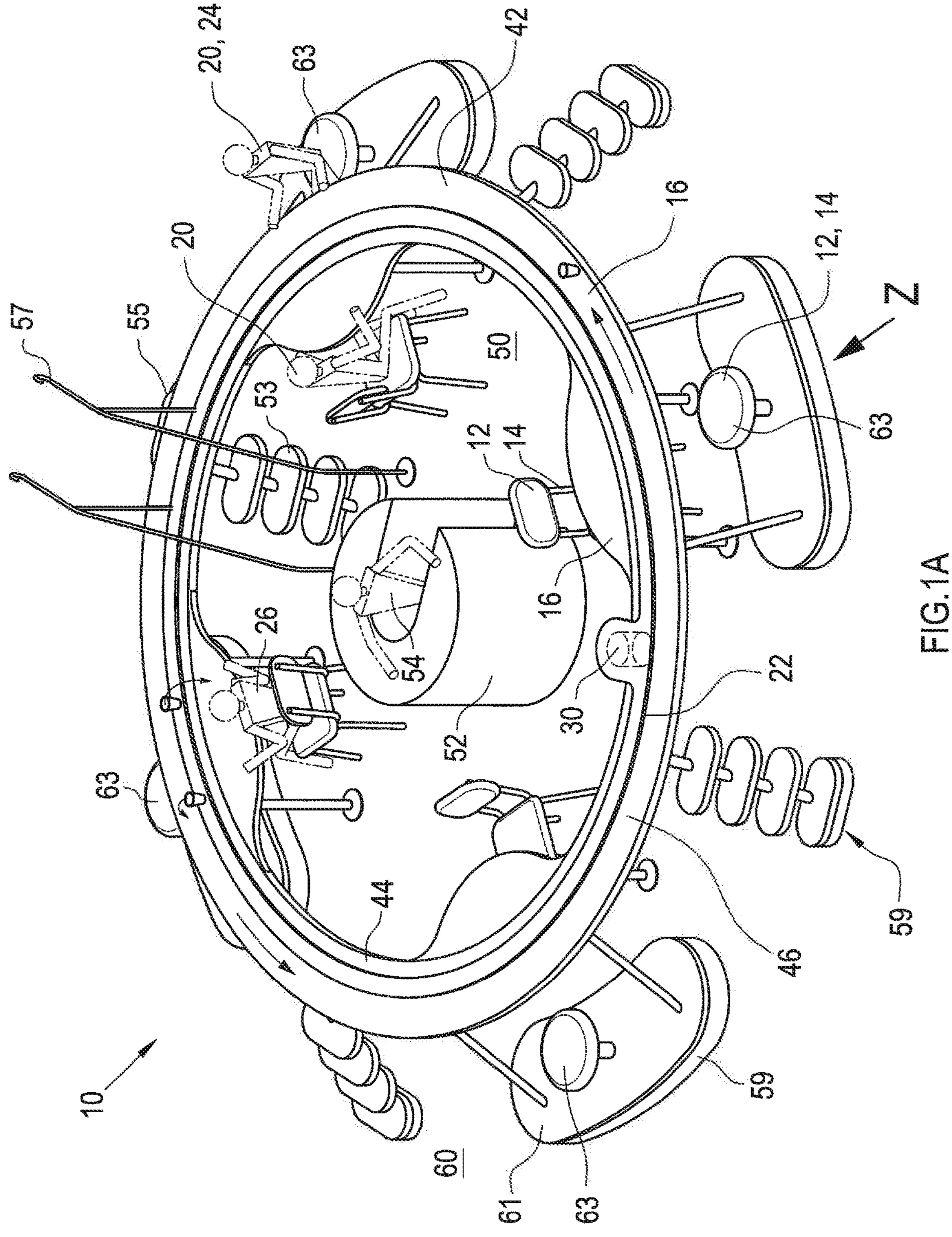
FIG. 1A is a perspective view of a first embodiment of the system of the invention.
Figure 1B:
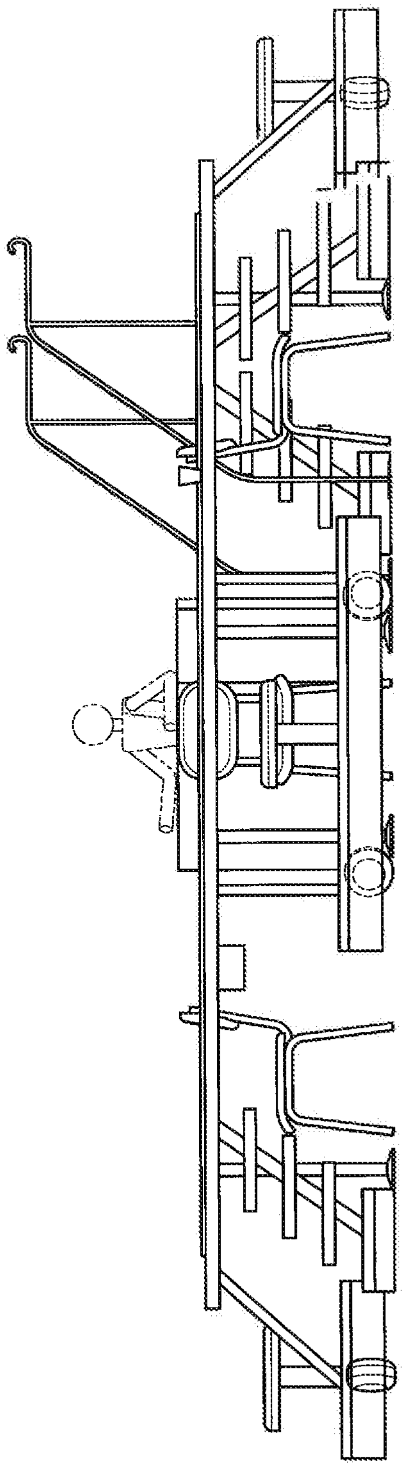
FIG. 1B is a side view of the embodiment of FIG. 1A.

Referring now to FIGS. 1A and 1B, a disposition system 10 includes disposition devices 12 such as seating or standing supports 14 and/or counter/table arrangements 16. The system 10 is adapted to dispose at least three persons 20. In this embodiment, up to 16 unique pairings can be made without participants changing seats.

In this system 10, a guiding system 22 guides relative movement of at least one person 24 of the at least three persons 22 to place the at least one person 24 so as to successively face one 26 of the at least two remaining persons for a desired time period. The control system of the invention then applies an algorithm which considers the sensed inputs and then controls movement of the device to divide the face-to-face contact time between the seated individuals in an equitable manner. For example, when one is sensed in the middle rotating seats, and two or more on the outer ring of seats, the system will divide the face time of the person on the central seating between those sensed as present on the outer seating. If two are on the middle rotating seats, and one in a seat of the outside fixed seats, the system brings each of the two in the middle alternatingly to the one on the outside fixed seat. The typical contact period allowed for each interaction is 8 minutes. However, where only one is located on the rotating seat and one on the fixed seats, these two persons are brought face to face and may be allowed to remain engaged in conversation until someone else joins by sitting in a seat of the system. Consequently, the algorithm uses presence inputs transmitted to the processor by presence sensors to select a suitable engagement routine. In one embodiment, inside the seat, a pressure sensor such as a silicone-filled "bladder", and an electronic control unit (ECU) is operably disposed. When someone sits on the seat, the pressure sensor signals the occupant's weight to the ECU. The ECU then sends that data to the processor. Alternatively, a strain gauge on a cord or strap may be used to sense presence and/or weight, or, for that matter, a unique strain measurement that is relatively unique to each user sitting in a seat. Based on that information gathered from all seats, the system 10 can choose an appropriate movement algorithm. Where the system is to be used for speed networking or speed dating, then the type of engagement is selected by the purveyors of the system or organizers of the speed dating event (e.g. heterosexual, friendship, etc). If a heterosexual speed dating engagement, the system has means for indicating where persons of a particular sex are to be seated, in order to create the face-to-face experience (male to female, for example) desired.

Note that the system 10 (and the other embodiments herein described) is functional as conventional lounge seating even when the system not in operation (i.e., is not moving).

Figure 2A:
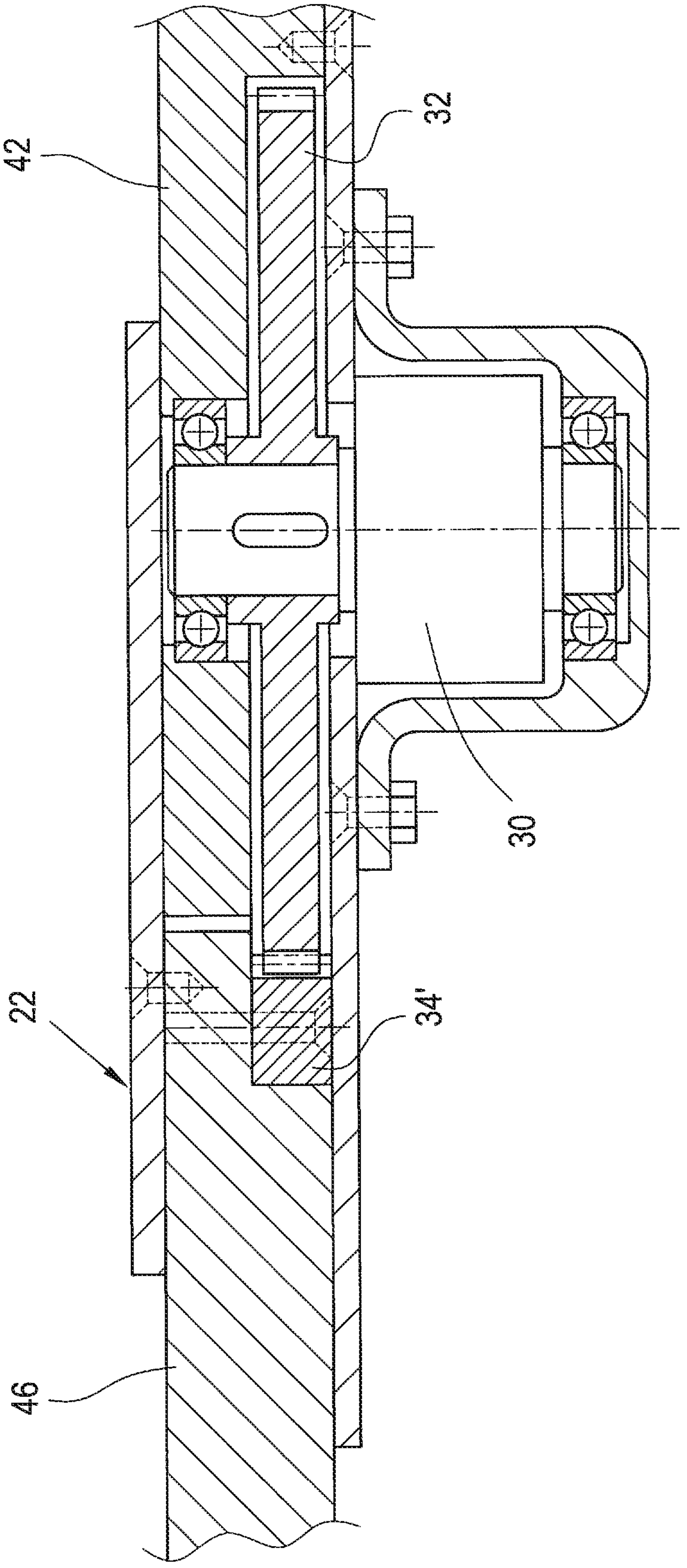
FIG. 2A is a cross-sectional view of a first embodiment of the rack and pinion system of the invention.

Referring now to FIG. 2A, in an embodiment, the guiding system 22 is activated by a motor 30, preferably an electric gear motor with a pinion 32 which reacts against a rack 34, 34' located on a component against which relative motion is to be imparted. However, the system may simply be moved by hand, for example by a moderator rotating a wheel which activates the gear engaging the rack.

Figure 2B:
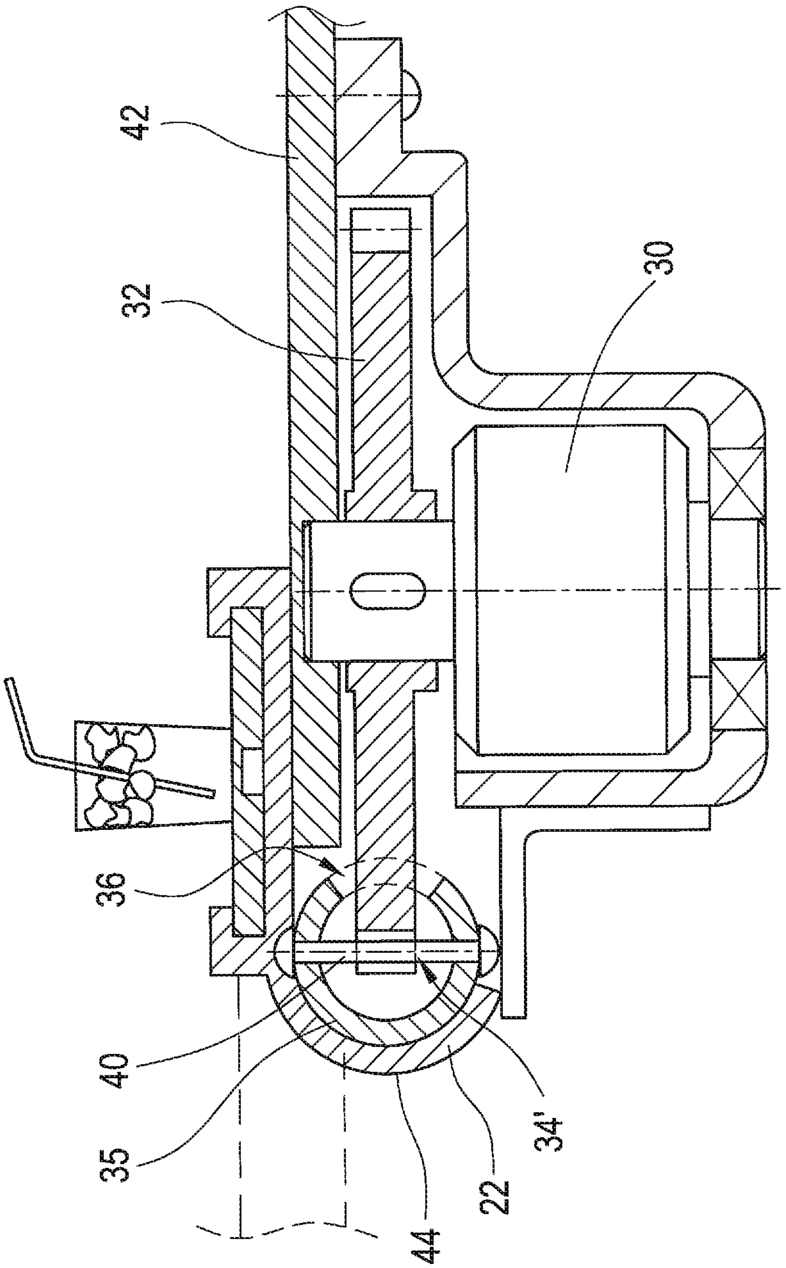
FIG. 2B is a cross-sectional view of a second embodiment of the rack and pinion system of the invention.

As depicted in FIG. 2B, the rack 34' may be made up of a tube 35 having one side 36 removed through which bolts 40 extend, and which are placed along the entire length of the tube, such bolts acting as teeth in which the pinion gear 32 engages.

Of course, relative movement of one person with respect to another may be imparted by motors which activate wheels directly, the wheels contacting the ground which when combined with friction, imparts motion to the platform, thereby doing away with the need for the rack and pinion system. Still further, an axially located motor may be used with swivel casters on the outermost periphery of the platform also eliminates the need for a rack and pinion system.

The guiding system 22 is advantageously a rolling table 42 in the form of a circular ring, which engages a ringed track 44 or rack 34, 34', along which an adjacent and abutting circular table system 46 is guided along a circular path. Advantageously, the circular table system 46 is a circular ring which encloses an inner area 50, in which a bar 52 or and/or a conductor 54 (someone responsible for controlling the movement of the system) may be disposed, with a suitable bar providing a ready storage space within arm's reach. Two steps 53, 55 are placed in-line with one another after each index movement from one position to another, in the drawing, every 90 degrees of movement. Handrails 57 provide for secure movement to and from the inside area 50 from the outside area 60.

Figure 17A:
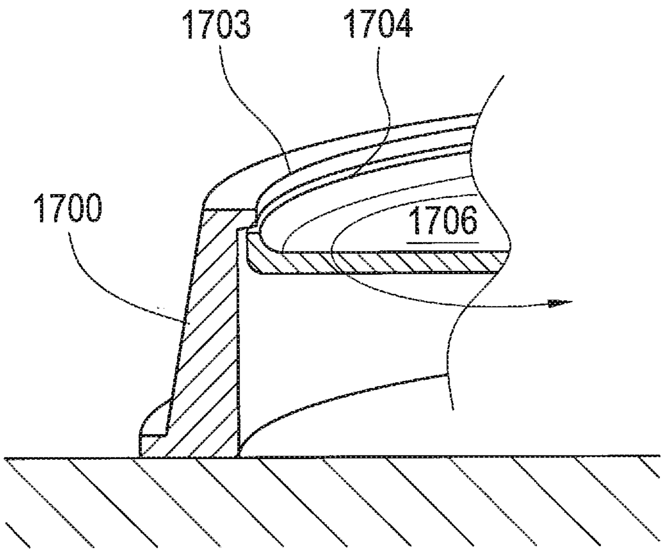
FIG. 17A is a cross-sectional view of a guard of the invention.
Figure 17B:
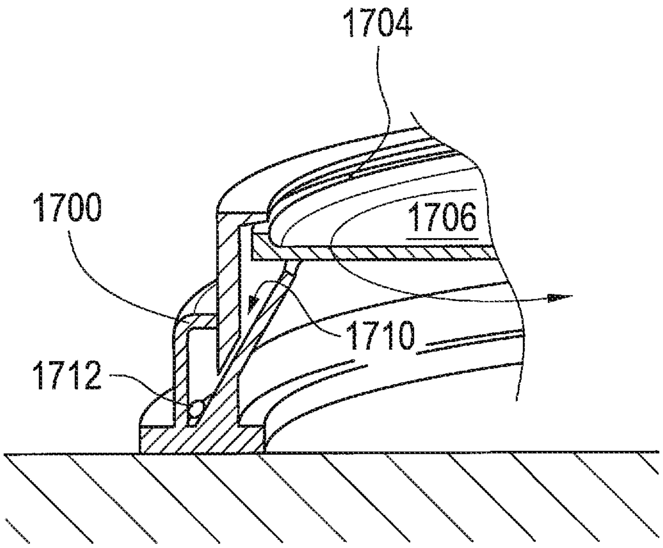
FIG. 17B is a cross-sectional view of an alternate guard of the invention.

A safety switch mounted on the device such that it is within the reach of each participant optionally prevents movement of the guiding system when persons leave the system or are being disposed and, for whatever reason, a participant wishes for motion to stop. The location of the seated persons is sensed with optics, lasers, capacitive contact sensors, resistance sensors, proximity sensors or strain gauge/weight sensors, for example. The sensing of a person in an area of potential danger initiates the safety switch and overrides the system's command to initiate motion. In addition, guards (see FIGS. 17A and 17B), made for example of rubber, preferably light weight rubber such as foam rubber (closed cell) may be used. The guards 1700, 1700' (a sort of skirt) rest on the floor 1702 but has a flange portion 1703 which extends above and over the lip 1704 of the rotating platform 1706, thereby preventing entry of toes, shoe tips, fingers, or loose items under the device. One embodiment 1700' includes a chute 1710 that allows items 1712 that may enter into the small space between the flange 1703 and the lip 1704 to slide away from the underside of the device, outward, in order to be easily retrieved through an aperture 1705 for example.

Clearly, the system is designed to minimize possible snag or pinch points in the system.

A challenge of the invention is providing a design that minimizes these possible snag or pinch points in the system. Consequently, all surfaces which move, and which find themselves close to the ground, are layered with thick foam rubber 59 of a wide depth so as to dispose the wheels sufficiently distant from feet or hands. The invention preferably incorporates a slip clutch which slips when too much resistance is met with, to prevent movement when a jam occurs.

The guards 1700, 1700' are light weight and so may be lifted up so as to access the underside of the device for cleaning or object recovery.

Of course, any number of persons may be accommodated with the system of the invention with an increase of size.

Figure 3:
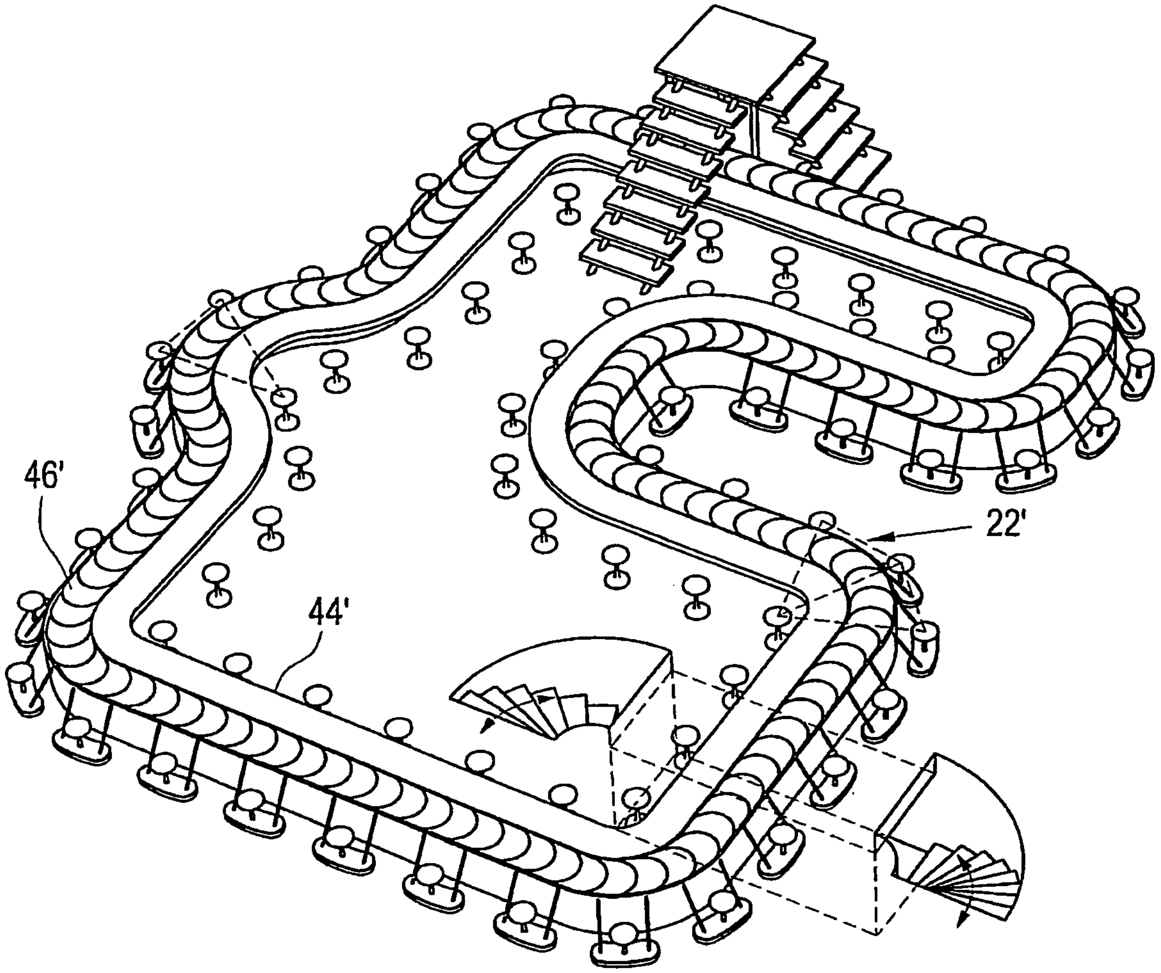
FIG. 3 is a perspective view of an alternate embodiment of the system of the invention.

Referring now to FIG. 3, in an alternate embodiment, the guiding system 22 is a conveyor arrangement 22', enabling the disposition system to take on essentially any form.

Using this system, the disposition devices are translated from one place to another, making contacts with other participants along its path. Further, with all embodiments herein described, the inner area or the outer area may move, while the other remains stationary, or both may move relative to one another. It is critical with the disclosed invention that at least one person be transported so as to be placed before another person, and then after a time period, before still another person. Preferably, all persons participating have a person disposed before them with whom they may communicate, socialize, or interview.

The invention derives its advantage by being able to relocate persons in front of other persons after a desired time period. The desired time period may be set by a conductor or a computer software program running on a computer processor. In a speed dating situation, this amount of time is typically 3 to 8 minutes long. At the end of said set time period, after a suitable beep and potentially a visible or audible countdown providing time for participants to change seats, relative motion may be initiated to place persons in another facing relationship.

Note that in a typical speed dating situation, where the number of participants of one sex is limited to no more than 7 to 10, at the end of the desired time period, an opportunity may be provided to exchange contact information. However, it is typically the case in a speed dating situation that the actual sharing of contact information at the end of the period of contact is discouraged but is provided once the constituents of a pairing indicate that they are both interested in making contact. However, in a simple embodiment of the invention, the participants are not required to pre-register online before being able to use the device. Therefore, unless the participants do what is typically done, namely, provide a fictive name or phone number, a clever way of allowing persons to sign up after the fact must be provided. One means is to provide information cards conveniently located with respect to the device which enable a non-preregistered user to add a unique nickname or handle, which can be shared with other participants after the contact. This user then can, after the fact, register online using this nickname or handle. Where the nickname or handle is a common one, the system of the invention may allow the user to indicate which event he or she participated in, which then allows the other person to contact them online after the face-to-face contact.

Note as well that in a heterosexual speed dating configuration, only males or females would be located on the moving portion of the device, while the opposite sex would be seated on the fixed portion. In such a case, the portion, probably the moving platform, would be dedicated to females. This would then allow for the suggestion that females should locate themselves on the rotating portion by configuring the rotating portion in a more feminine look such as a pink color, while the male portion is configured in brown, a more masculine color.

In one embodiment, a payment system is provided to enable a participant to delay disengagement with another facingly disposed person. A means to accept payment to accelerate the change is also envisioned. The payment system is provided for taking payment from persons which wish to be disposed on the system, who wish to remain on the system for a longer term, or who which to be matched in a desired way.

In another embodiment, a conveyor system conveys refreshments or food between facing persons. Optionally, a sensor in the conveyor system detects drinks or food taken from the system for billing purposes. For this purpose, the register of the conveyed disposition device is tracked and known, and associated with adjacent or proximate persons on the system in order to properly attribute the taken drinks or food for billing purposes. A suitable system is described in U.S. application Ser. No. 10/203,680, entitled Portable Sushi Counter with Conveyor Belt, filed Jan. 31, 2001, the content of which is incorporated herein in its entirety and relied upon.

The disposition system ideally has a payment system for taking payment from persons which wish to be disposed on the system, and a mechanism for detecting whether enough persons have enrolled to use the system in order to make the use of the system interesting for the participating users. These surfaces would include the bases 61 of the moving chairs 63, and of the moving steps 55 for example.

Figure 5A:
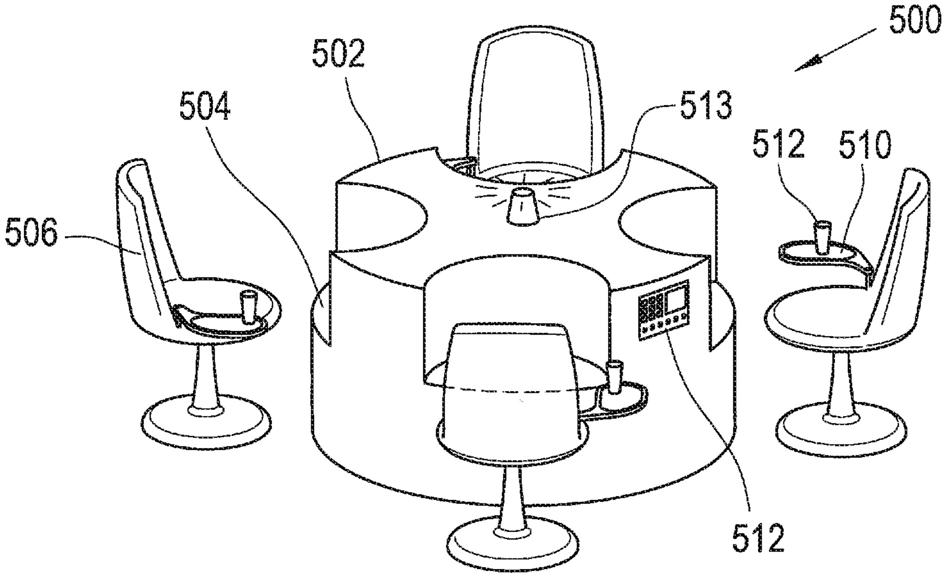
FIG. 5A is a perspective view of an alternate embodiment of the invention.
Figure 5B:
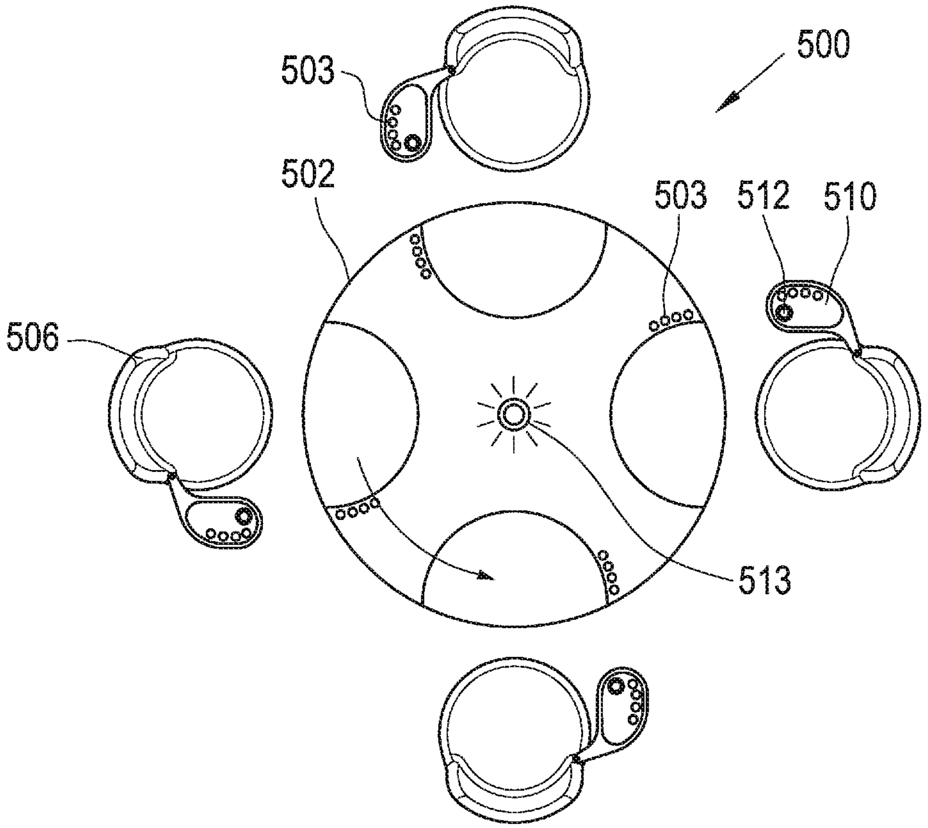
FIG. 5B is a top view of an alternate embodiment of the invention of FIG. 5A.

Referring to FIGS. 5A and 5B, an alternate embodiment 500 of the invention includes a central portion 502 which may be translated to relocate a person disposed thereon in a seat 504 for example, to another person in a seat 506 at a fixed location. Ideally a counter surface 510 is provided to dispose drinks 512 and the like.

Figures 25, 26:
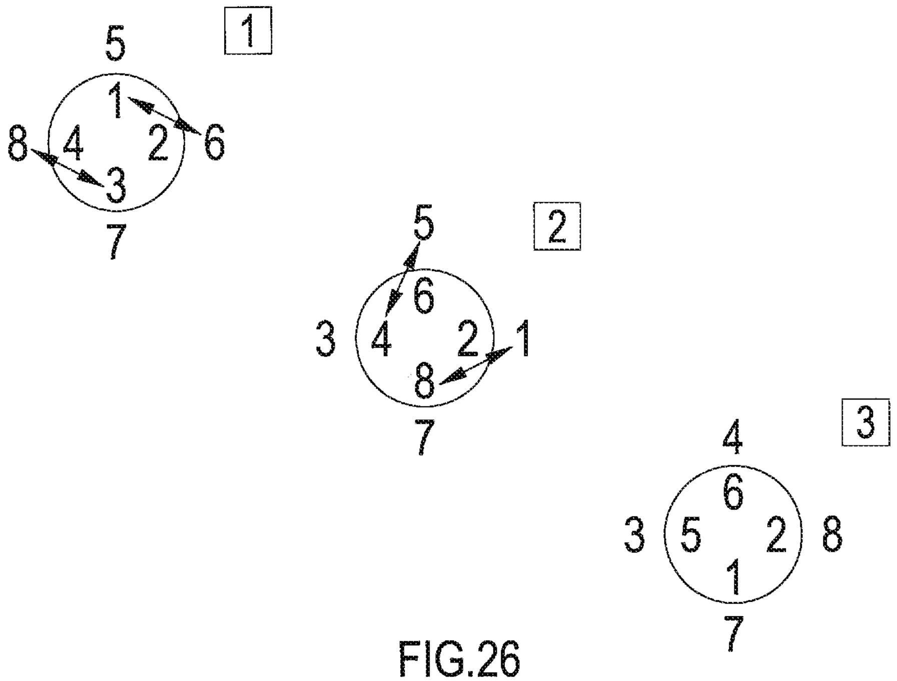
FIG. 25 is a graphical representation of the building up of all possible unique connections using the hardware of the invention.
FIG. 26 is a graphical representation of the seat changes believed required in order to maximize the number of contacts in three stages.

It should be noted that the total number of all possible unique pairings with 8 persons is the number of persons times the number of persons minus one (8 persons are able to make 7 contacts, without changing seats), such an arrangement is capable of creating 8×7, or 56, ×½ 56 or 28 total possible new pairings. See FIG. 25 for a graphical illustration of the foregoing. A 4×4 array of the invention described in FIGS. 5A and 5B can make 16 (i.e., 4×4) unique pairings without changing seats. All possible pairings (all 28 possible) can be achieved by allowing alternating persons on the outer ring to change seats with alternating persons on the inner rotating ring, twice, alternating different persons between the second and third configuration. This results in a total of 16×3 pairings (48 total pairings) where many are redundant (namely 48 total pairings minus 28 total possible unique pairings, leaving 20 redundant pairings). Of course, it is not undesirable to have redundant pairings, but it is reasonable to measure the pairing efficiency of the device arrangement by looking at the number of unique pairings capable without changing seats and comparing this with the total number of all possible pairings. Consequently, in this example, the efficiency would be 16/28 for one configuration without seat exchanges, or about 58%, which represents a baseline efficiency. With two more rounds (one possible configuration being shown in FIG. 26) in which seats are changed, all possible 28 unique pairings or matches are accomplished, but with the sacrifice that a number of redundant pairings (namely 12) are also made. Note that 100% efficiency is not desired in all cases, particularly when men wish only to meet women and vice versa. Consequently, a console adjacent each seat can instruct the users to change seats to suit the goals of the engagement, between operation intervals (when the device is not moving) from one marked seat to another by providing an audible or visual suggestion via a speaker or a display, in order to achieve the total number of possible unique pairings. The seat switching can be optimized mathematically, heuristically or experimentally, in an effort to increase pairing efficiency and/or to minimize the number of seat changes required.

Further unique pairings are possible in an embodiment where the outer and/or inner seats are able to be automatically (or manually) turned to face adjacently seated users, those who would otherwise not meet each other. This capacity can be built into the versions of the invention discussed herein, which have a rotating platform, by allowing the seating on the platform to turn on their own axis, and via a drive shaft that extends from a base of the rotating platform outwardly to the fixed seats, thereby enabling turning of these outer seats toward each other on command of the controller.

Figure 6:
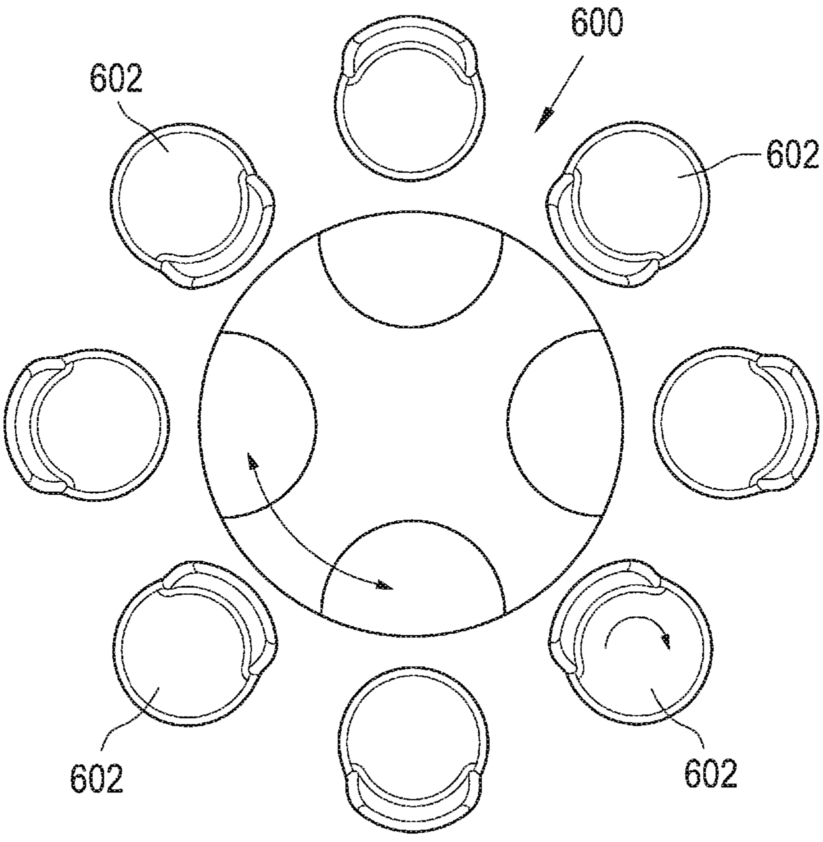
FIG. 6 is a top view of a variation of the alternate embodiment of FIG. 5A, in which more fixed seating is provided.

Referring now to FIG. 6, a variation 600 of the alternate embodiment of FIG. 5A, in which more fixed seating 602 is provided. Here the number of unique pairings is 8×4, or 32. Further, this embodiment shows outer seats turning outwardly during pause intervals, which occur when the outside number of seats is greater than the inside number of seats. Alternatively, the system of FIG. 6 can create three person discussion circles, thereby giving those who sit adjacent each other on the outer ring an opportunity to meet, perhaps facilitated by the person on a centrally rotating seat. In such an embodiment, privacy baffles may be used to demarcate the three person discussion groups and not just persons seated opposite one another. In such a situation, it may be advisable to have the baffles foldable (preferably at their extremities), either automatically, or manually, to improve the demarcation of the three way conversation or to at least partially remove the barrier effect.

Note as well that a user can choose a seat based on their own personality or energy level. An outgoing, energetic user would likely prefer a seat in the middle rotating portion because he is potentially placed in continual contact with others. A more reserved or less energetic user would choose an exterior fixed seat, because there is a pause between contacts. A user may also choose the outside seat because he has a problem with motion sickness. Users can also choose to avoid other users by re-seating themselves on the same relative side of the system (either the rotating side or the fixed side).

Figure 7:
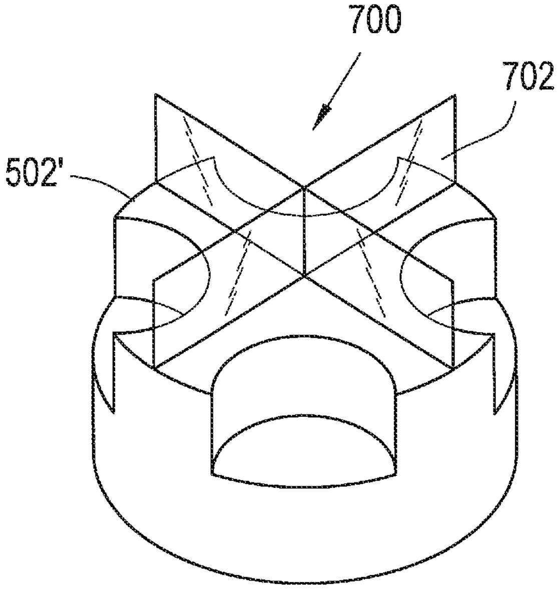
FIG. 7 is a perspective view of the central translation device having privacy baffles.

Referring now to FIG. 7, in another variation 700, the central translation device 502' may have privacy baffles 702.

Figure 8:
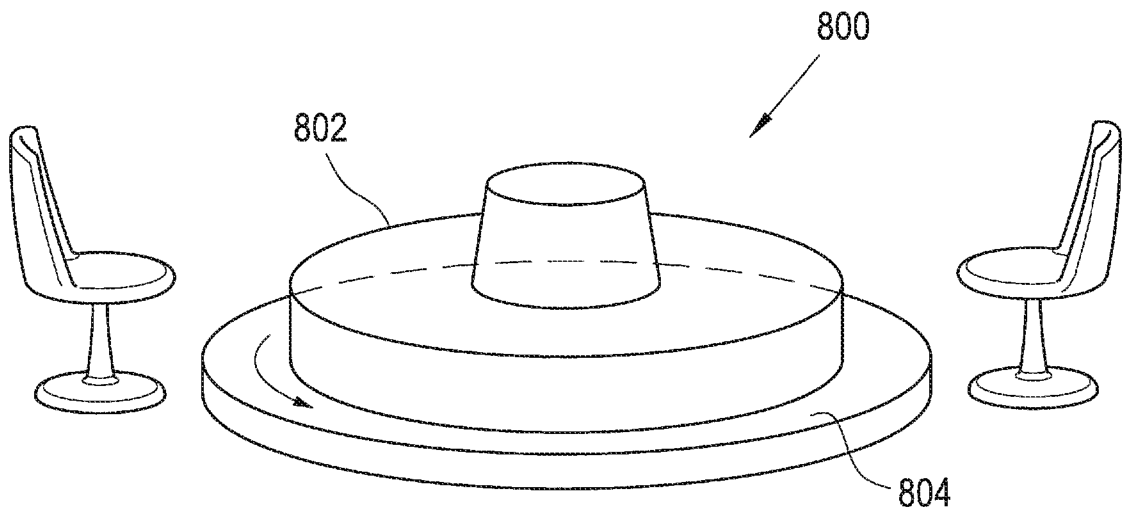
FIG. 8 is a perspective view of a simple embodiment of the invention in which a couch is disposed on the translating platform.

Referring now to FIG. 8, a simple embodiment 800 of the invention includes a couch 802, such as a settee couch, disposed on the translating platform 804.

Figure 9:
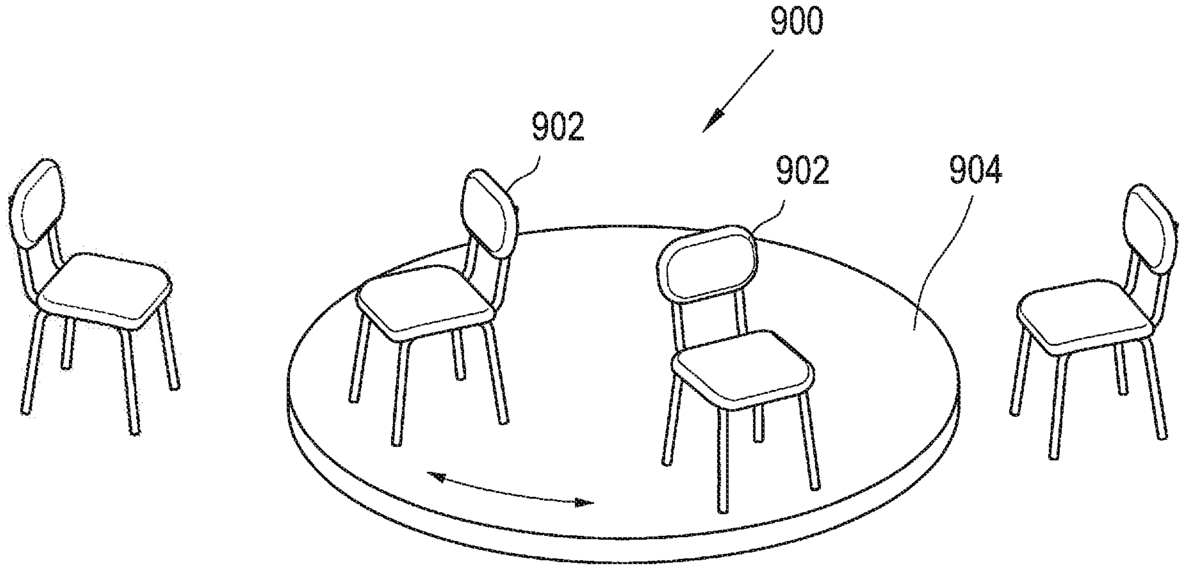
FIG. 9 is a perspective view of an even simpler embodiment, in which mobile seating is disposed on the translating platform.

Referring now to FIG. 9, in an even simpler embodiment 900, mobile seating 902 is disposed on the translating platform 904.

Figure 10:
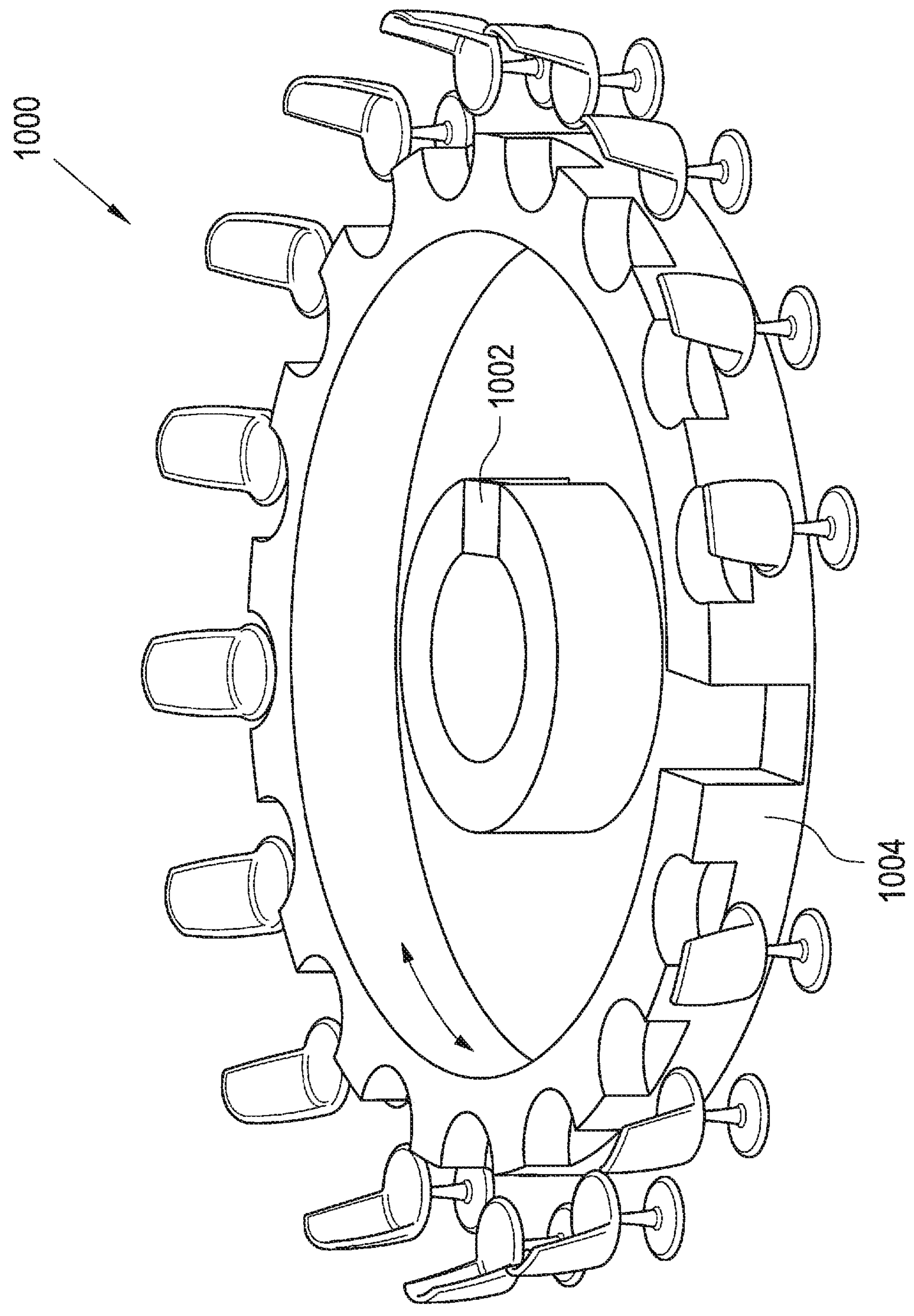
FIG. 10 is a perspective view of a large ring shaped arrangement of the invention having a central bar or a conductor seating arrangement within the translatable disposition device of the invention.

Referring now to FIG. 10, a large ring shaped arrangement 1000 of the invention has a central bar or a conductor seating arrangement 1002 within the translatable disposition device 1004 of the invention.

Figure 11:
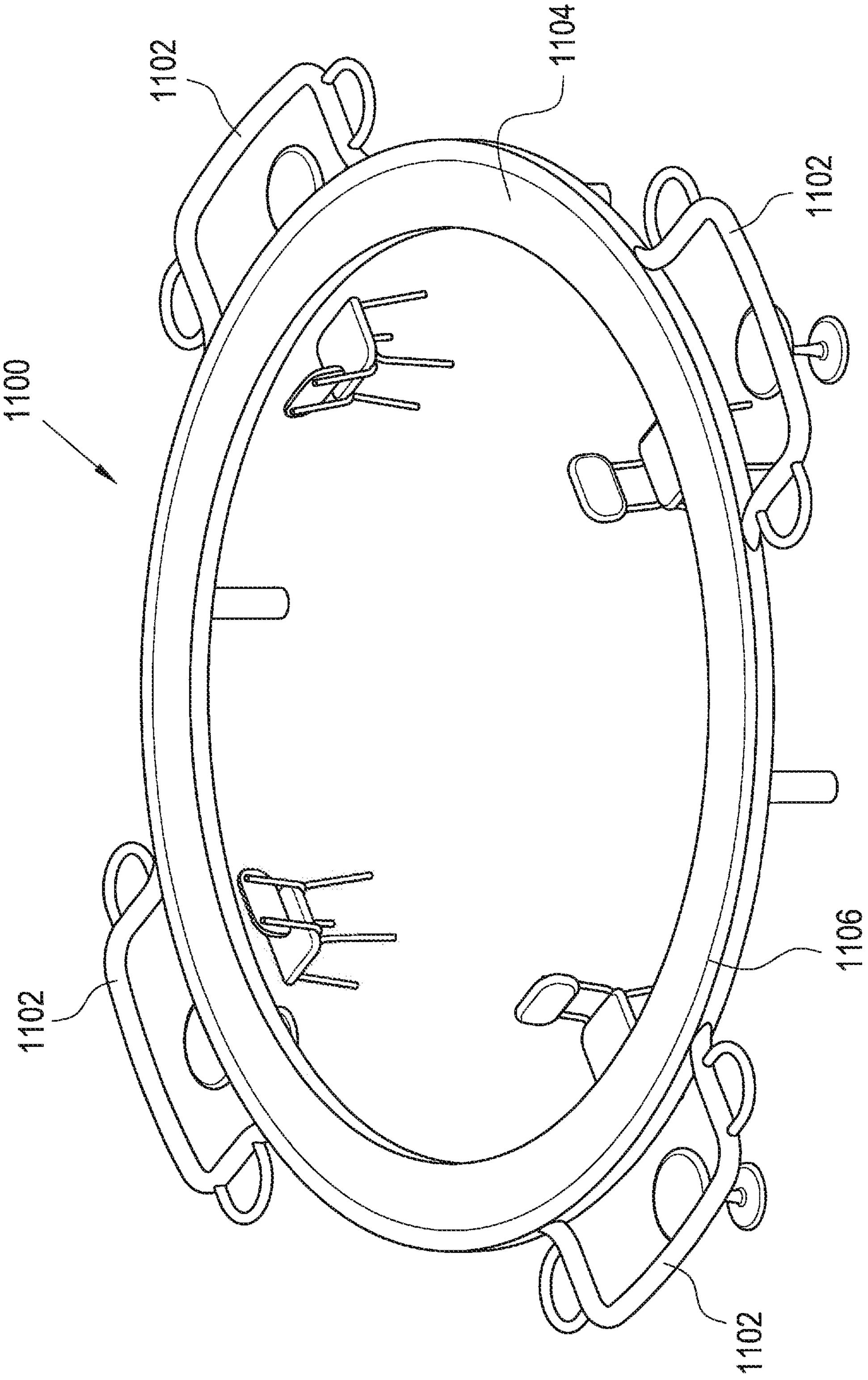
FIG. 11 is a perspective view of an arrangement of the invention in which no seating is displaced, but rather, a guiding hoop guides persons to move from one place to another on foot.

Referring now to FIG. 11 is a perspective view of an arrangement 1100 of the invention in which no seating need be translated, but rather, a guiding hoop 1102 guides persons to move from one place to another on foot. The hoops 1102 are guided to rotate around the table 1104 on a chain 1106 or, when the table is round, on a ring fitted with bearings (not shown), for example, to ensure smooth operation. This embodiment 1100 is advantageous in that the masses of users need not be translated, thereby avoiding complicated and heavy designs. This solution is simpler because the table 1104 is fixed. In one variation, when the hoop is touched, an alarm may go off until the person moves away from the hoop, which means until the person allows himself to be guided to the next position to make a match. Alternatively, proximity sensors or capacitance sensors detect touch or proximity to sound an alarm to encourage the person to comply with the need to relocate himself. At the same time however, this embodiment suffers from the disadvantage that some users may be put off by being "corralled" and "forced" to move, something that the other embodiments of the invention avoid.

Figure 12:
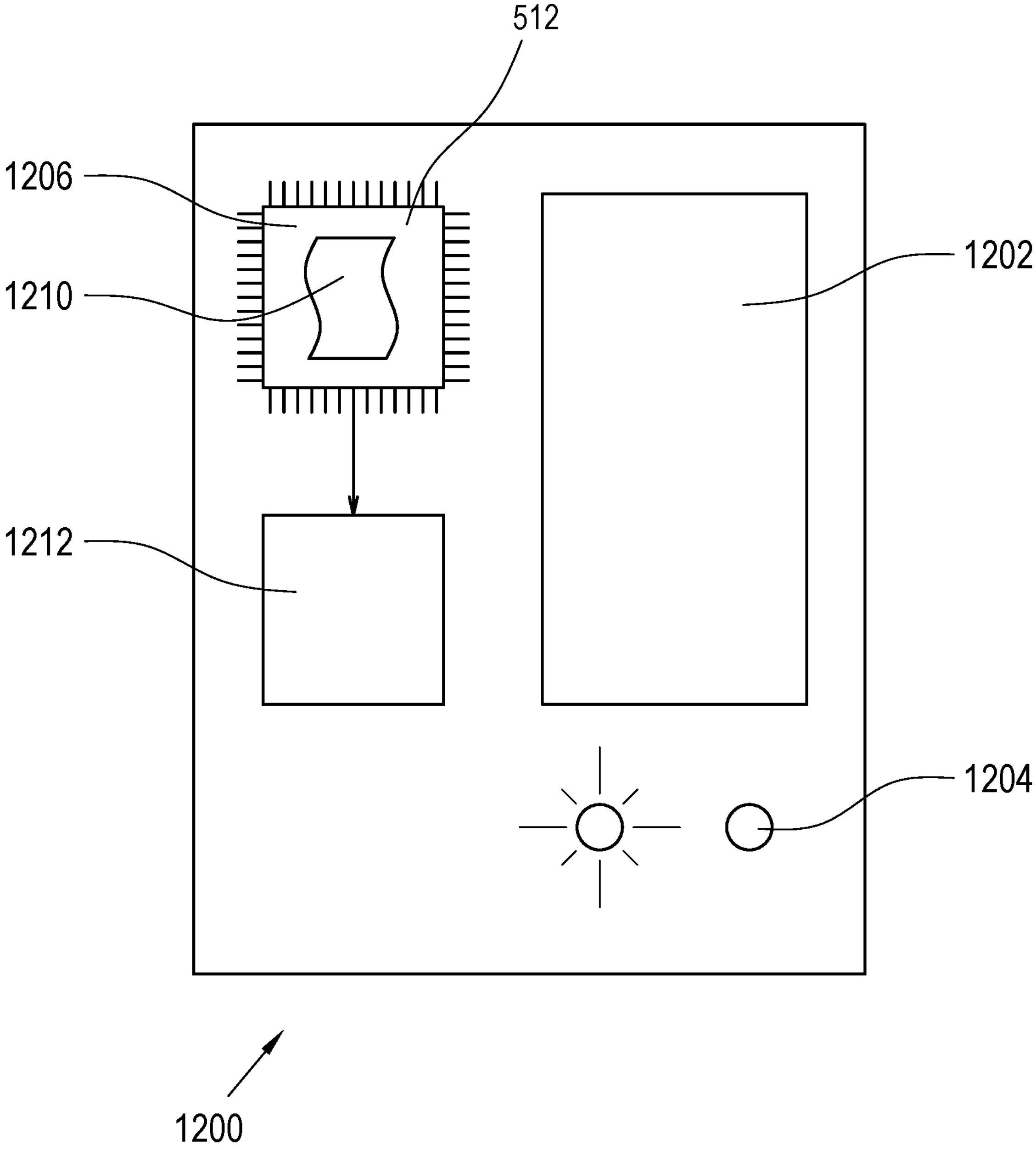
FIG. 12 is a schematic diagram of a controller of the invention.

Referring now to FIG. 12, a controller 512 controls the translation of users disposed on the system of the invention. The controller 512 comprises a processor and a non-transitory computer readable storage medium programmed with application software executing method steps described herein. In a first step, according to optional inputs from users or the purveyors of the system, the processor interrogates each presence sensor (using optics, lasers, capacitive contact sensors, resistance sensors, proximity sensors or strain gauge/weight sensors) embedded in each seat, which causes a presence or non-presence signal to be sent by each seat together with a unique seat identifier, in order to enable the processor to determine which seats are occupied. In a second step, the processor takes the information received from the seats and feeds this information into an algorithm adapted to direct movement of the seats such that face to face contact is made between those detected to be present. In a third step, the processor controls the motor(s) driving the seats according to outputs of the algorithm in order to share the time between the persons seated, preferably in an egalitarian manner. The optional inputs mentioned above may be the time duration of face-to-face contact that is desired, and the selection of the algorithm desires, such as a dating algorithm, a networking algorithm or other algorithm style. For example, if a dating algorithm is selected, then the system may optionally take inputs from each person seated, such as the sex and sexual preference of that person, and use that input to make the appropriate face to face contacts. In a more passive variant, the system may use proximity sensors which detect the proximity of the legs of those seated to the arm rests in order to guess whether the person seated is male or female (the greater the proximity of the legs to the armrests, the more likely that person is male, and the more distant the legs from the armrests, the more likely that person seated is female).

The controller 512 further includes an interface 1202 such as a touch screen, a keyboard of input buttons, facilitating the activation of the controller and the selection of the operation mode of the controller. Circuitry (not shown) conducts the flow of electricity to a motor to activate the same or to change polarity to reverse the same. In addition, the circuitry controls the acceleration of the device, such that the movement is smooth and almost unnoticeable. Sensors provide inputs that the controller uses to optimize the user experience. Colored light indicators 1204 communicate with the user. A processor 1206 runs software code 1210 to open and close switches 1212 to provide more or less power or change current flow direction, to enable control of the invention in a desired manner. An input panel may be provided adjacent to each seat, but for simplicity, the same may be provided only to seats that are translated. In a simpler embodiment, the panel may be a physical panel or marker board, where the individuals or users write their names and some characteristics about themselves and turn the panel so as to be read by the opposing user with whom they are engaging, thus avoiding complicated electronics or a connection to the Internet.

In sum, the disposition system of the invention includes disposition devices such as seating or standing supports and/or counter/table arrangements adapted to dispose at least two persons in which a guiding system guides relative movement of at least one person of the at least two persons to place the at least one person so as to successively face one of the at least one remaining persons for a desired time period.

The guiding system is activated by a motor, by a gear motor and rack and pinion gear arrangement, or by hand, such as by rotating a wheel or by a push or pull handle.

In one embodiment, such as that of FIG. 3, the guiding system is optionally a conveyor arrangement. The conveyor arrangement is a closed loop. The closed loop may be of any serpentine form.

Referring in addition to FIG. 5A, in another embodiment, the guiding system has at least one rotating table. The rotating table may be formed as a ring as depicted in FIGS. 1A, 1B, and 8. Referring now to FIGS. 5A, 5B, 6, 7, 8, and 9, in a simple form, the disposition system is a round couch disposed on a rotating platform. Referring to FIG. 10, in its simplest form, the couch is replaced by chairs disposed on the rotating platform.

The desired time period to be matched is typically a set time period. At the end of said set time period, translation or relative motion is initiated to place persons in another facing relationship.

A computer processor initiates relative motion to place persons in the facing relationship.

One can imagine that such a device might be disposed at a bar at a conference hotel. An advantage of the invention is that no registration or software downloads are necessary to participate in use of the device. For example, a busy executive travels to a conference hotel at which one such device is used. The executive sits on a seat of the system of the device. When only one person is seated, nothing need happen—no movement or coordination of motion of each seat. However, the device is programmed to sense the position of each person seated on the device. When one person is seated on the outer ring of seating, and one on the rotating couch, then rotation is initiated to place the persons seated in face to face contact. Where three persons are seated, two on the outside ring and one on the rotating platform, then the person on the rotating ring is place in face to face contact with the persons on the outer ring. Depending on how many persons are seated on the device, the system of the device calculates a fair division of time among the participants so as to fairly distribute the time spent between them. When the system seating is full, then of course, the system divides the time evenly between the persons seated on the rotating platform and the outer ring.

A refreshment or food conveyor system conveys refreshments or food to persons disposed on the disposition system. Sensors in the conveyor system register the lifting of drinks or food taken from the conveyor system for billing purposes. It is assumed that taken drinks or food were taken by the person proximate the drink or food location for billing purposes.

In other words, the invention is a disposition system including a central translatable disposition device comprising at least one seat or standing support and/or counter/table arrangement. The disposition device is adapted to transport a user person disposed on the at least one seat or standing support and/or counter/table arrangement to face one other or preferably one of at least two fixed seats or standing supports and/or counter/table arrangements for a time period. After this time period, the system translates the at least one seat or standing support and/or counter/table arrangement to face another of the seats or standing supports and/or counter/table arrangements for another time period.

Although it may be controlled by hand, transport of an user is optimally controlled by a controller. The controller reads inputs of presence, strain gauges, and/or weight sensors associated with the at least one seat(s) or standing support(s) and/or counter/table arrangement(s) to ensure that users disposed on the fixed and translatable seat(s) or standing support(s) and/or counter/table arrangement(s) are matched with each other for a time period. A console having a touch screen or other input device optionally disposed on the disposition system can display or even locally audibly broadcast, via a speaker, characteristics of two participants that match based on some input criteria (for example, indicating "you both like sushi", or "you are both attorneys", or "you are both Texas Aggies") as well as enable a participant to choose to command the controller to solicit or to avoid further contact with the person with whom they have been matched (on the basis of such sensed presence, strain or weight), such command continuing until the presence detector detects that at least one of the persons involved has lifted off the seat or standing support (and, based on comparable strain/weight, surmise that they have simply changed seats). Avoidance may be accomplished by switching seats to one which makes a repeated match impossible (from a rotating seat to a fixed seat, for example), or by simply allowing the seat of a person who wishes to avoid someone to be rotated away from that person prior to a match being made (this is shown in particular in FIG. 18, where the inner or central seats can rotate away from the facing person). Rematching of two individuals or users may also be contingent on both individuals or users indicating that they are willing to be matched again with the other individual or user, or by omission, where no objection is made by the individuals or users, a second or further match is made possible.

Privacy baffles separating seats or standing supports from adjacent ones minimize distractions and so focus the attention of matched users.

In another aspect of the invention, a controller controls the transport of users to establish alternating facing relationships for a time period. The controller is fed with detected inputs indicating the presence of individuals/users disposed on fixed and translatable seat(s) or standing support(s) and/or counter/table arrangement(s), to match those users detected to at least another user in a prescribed way.

The controller may make random or consecutive matches, or matches based on match criteria according to programmed inputs.

Figure 4:
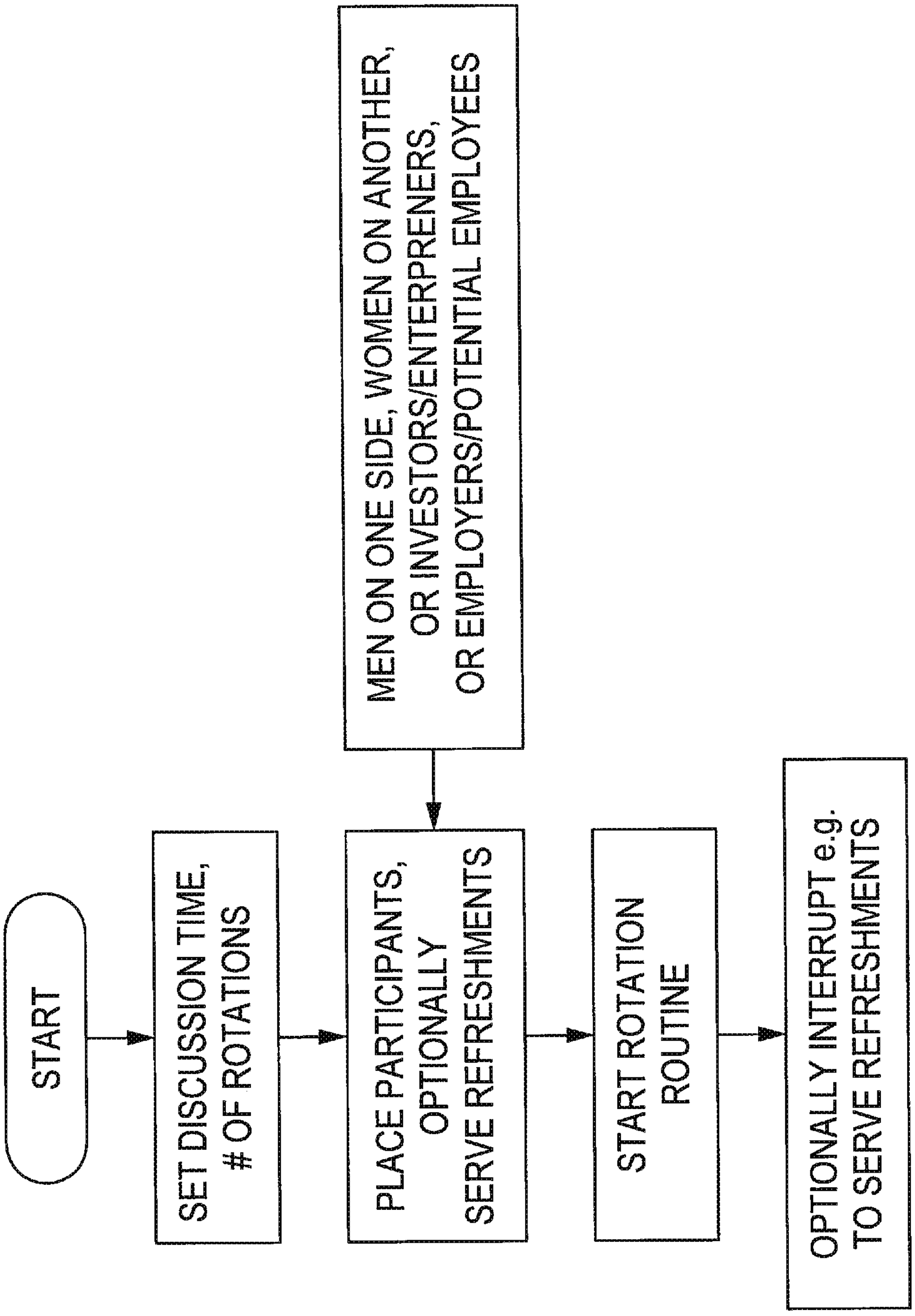
FIG. 4 is a flow chart of a method of the invention.

Referring to FIG. 4, the matches may be made to match men to women or vice versa, to match employers to candidate employees or head hunters and vice versa, to match investors to entrepreneurs and vice versa, to match students and teachers for testing purposes, such as oral examinations, thereby enabling review of student's oral knowledge by one or more teachers and enabling a grading system in which each teacher can register a grade for the performance of each student. The matches may be made between managers of companies considering merger, to facilitate understanding of the needs and wishes of the managers. The matches may be made simply as introductions successively, which would facilitate persons attending a family reunion or wedding in getting to know one another. The matches may even be made between members of hostile groups of users under controlled conditions to facilitate communication and understanding with a view to resolving disputes. It is easy to imagine the social benefits of bringing hostile groups together face to face (i.e., in promoting peace) while being able to emphasize (via a visual and/or audible prompt) all the things/characteristics/interests the users have in common, enhanced by the power of the computer in making comparisons based on the profile inputs of the users, at least those for which the users have allowed comparisons.

In a further embodiment, the app or app and device combination of the invention includes a feature allowing each participant to select their language and to activate voice recognized translation to the language selected by the other participant, thereby allowing for voice recognition and simultaneous translation of the conversation between participants by displaying to the listener on a display in text or computer generated speech a translation of the speaker into a language comprehensible to the listener. For example, using the networking roundtable of the invention, each participant is shown the common interests in their own language, and is given the option of voice recognized translation of live questions to the other participant in their language. The app then should of course, compare profile information originally saved in different languages. This step involves language translation and comparison to at least one language, which is typically the language of one of the users, or a common language like English. The comparison and indication of common interests in a language understood by the user, as well as the opportunity to respond or engage in conversation using one's own language helps develop understanding between citizens of different nations and cultures. Such embodiment is particularly useful for business man travelling in foreign lands which use other languages because not only is the discussion translated into the relevant language, but the common interests are recognized and displayed, prompting further discussion.

Input means such as a selection push button allows persons who dispose themselves on the device to be matched to input at least one of a group of characteristics consisting of gender, age, sexual orientation, profession, employment status, interests, and purpose in being matched. The characteristics input may be of the disposed persons and/or of those with whom they would prefer to be matched.

The controller may be programmed to operate to effect a match only when persons on the translatable or the fixed side are detected, because no matches are possible. Where no match is possible, the controller may optionally initiate a waiting routine, which optionally slowly translates a translatable seat(s) or standing support(s) and/or counter/table arrangement(s). Or it may audibly signal one or the other occupant to change their seat such that a match is possible.

In one variation, when presence detection indicates a match can be made, such as at least one user disposed on a fixed seat(s) or standing support(s) and/or counter/table arrangement(s), and at least one on a translatable seat(s) or standing support(s) and/or counter/table arrangement(s), the controller initiates translation to make the match.

A warning light, such as a red light, indicates when it is not safe to take a seat or dispose a user on the translatable seat(s) or standing support(s) and/or counter/table arrangement(s). This warning, when made shortly before the translation of the device, is also an indication that it is time to break off the conversation. Another colored light may also provide this warning, or a message on a console disposed next to the seated user may provide this indication as well.

The time period is preferably counted down on a display visible to the users, to allow for last minute exchange of contact details, and to properly say goodbye.

The controller optionally receives inputs from the users indicating a desire to be matched again, or not, with another user, at least for the duration of the detected presence of the another user. When presence is detected and seating may be suggested via, for example, a light or sound indication, in order to achieve an even distribution of weight on the translatable seat(s) or standing support(s) and/or counter/table arrangement(s) to optimize the matches to be created according to a set criteria. Depending on the number of input users and their interests, seating locations may be suggested by lighting such as coded colored lighting.

The controller assumes that a desired user is still present when their non-presence has not be registered, such non-presence being registered by the presence indicator indicating an interruption in presence such as the desired user lifting out of their seat.

A payment system is provided for taking payment from persons which wish to be disposed on the system, who wish to remain on the system for a longer term, or who which to be matched in a desired way. The payment device may allow persons to pay to make another match with a desired user.

In another aspect of the invention, a novel café, bar, restaurant or conference center has at least one disposition device as described above, in which each device is themed as selected from a group of themes consisting of dating, friendship, business contacts, networking, employment, over 30 dating, over 40 dating, under 30 dating, and under 40 dating.

Figure 13:
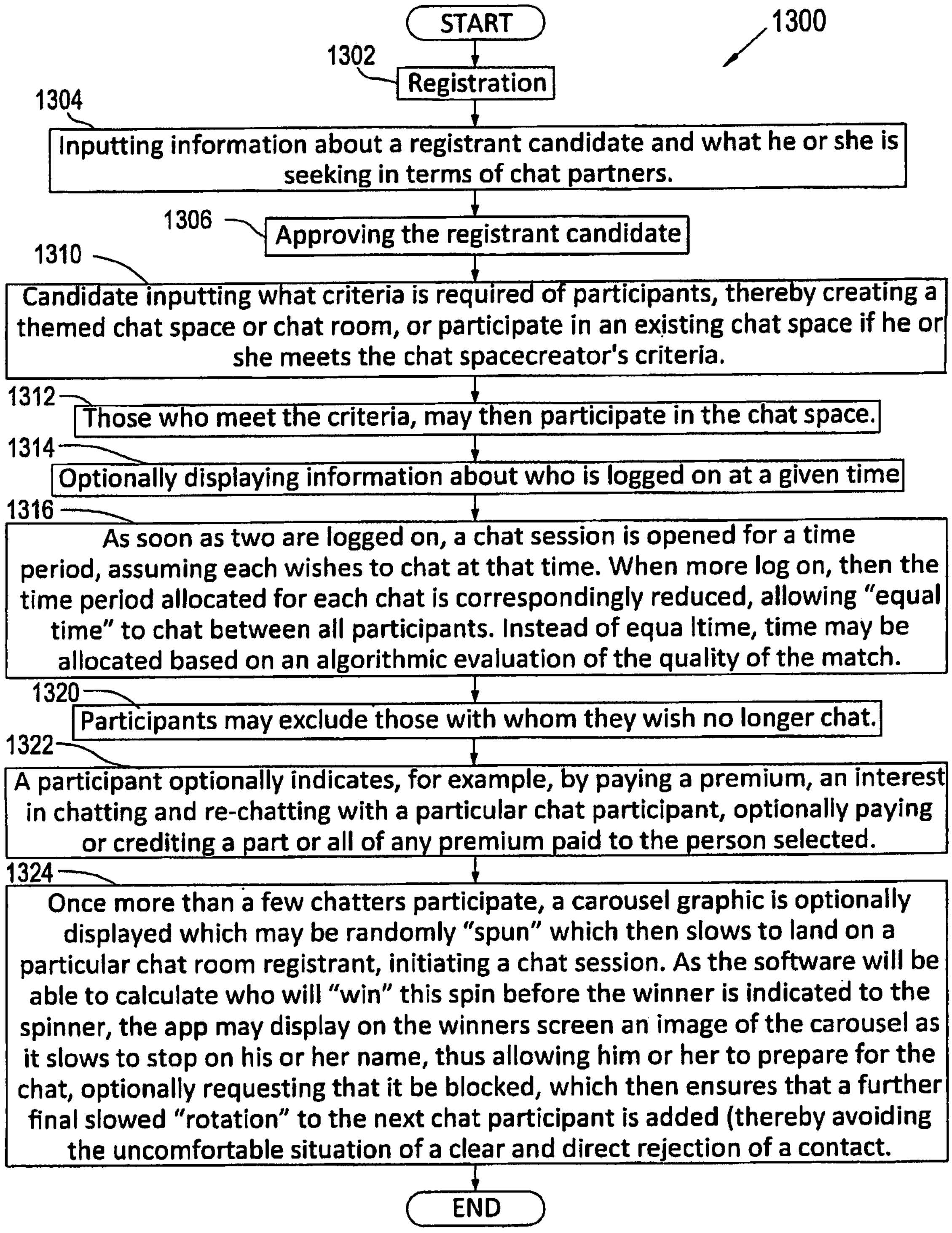
FIG. 13 is a flow chart of an app which mimics the invention in the virtual world.

Referring now to FIG. 13, in still another aspect, the invention may be implemented fully or partially in software, via a smart phone app. In such an embodiment, a registration step would register those interested in chatting with each other. The registration step includes inputting information about a registrant candidate and what he or she is seeking in terms of chat partners, professional service providers, mates, or friends. The registrant candidate is then approved, if he or she meets the general registration criteria. As a registrant, the registrant may then create a chat theme, inputting what criteria is required of participants, thereby creating a themed chat space or chat room, or participate in an existing chat space if he or she meets the chat space creator's criteria. Consequently, only those registrants with suitable characteristics may participate in the themed chat room. The chat space is then available for those of common interest, facilitating the creation of a community. Those who meet the criteria may then participate in the chat space. The app then knows and displays information about who is logged on at a given time. As soon as two are logged on, a chat session is opened for a time period, assuming each wishes to chat at that time. When more log on, then the time period allocated for each chat is correspondingly reduced, allowing "equal time" to chat between all participants. Instead of equal time, time may be allocated based an evaluation of the quality of the match.

The app mimics the invention in the virtual world. As with the physical invention (which selection may indeed affect the reality by excluding a match on the physical carousel), the participants may exclude those with whom they wish no longer chat (by for example, registering the weight sensed (via for example a strain gauge) of the excluded person and excluding that person from further contact at least for a prescribed time period, or excluding them based on a registered member number), and the system then seeks other matches, dividing the time between those non-excluded chatters. A participant may indicate, for example, by paying a premium, an interest in chatting and re-chatting with a particular chat participant. Any premium paid may be partially or fully credited to the person selected. In this manner, those with whom chatting is desirous can build a following and thereby earn credits which may be "cashed in" (for money, points, gifts, coupons, or vouchers) at a desired point in the future. Once more than a few chatters participate, a carousel graphic may be displayed which may be randomly "spun" which then slows to land on a particular chat room registrant, initiating a chat session. Using the inputs of momentum and speed, the software calculates in advance of the actual final stopping point, i.e., who will be selected by this spin. The app may then display on the spinner's screen an image of the carousel as it slows to stop on the final selection's name or picture, thus allowing him or her to prepare for the chat, optionally requesting that it be blocked, which then ensures that a further final slowed "rotation" to the next chat participant is added to move the next person.

In fact, the app may mimic via a graphic display on the disposition device, the actual translating disposition device indicating summary information to each participant about who is present on the disposition device. Payments requesting matches or the indication of preferences then may also be or alternatively be considered to bring persons on the disposition device together. In a variation, the system may perform a "roulette" match, in which the carousel is spun and the match is made randomly. Consequently, the associated app includes corresponding steps which randomly match but which avoids being rematched to someone with whom the user has already been matched.

In an alternate embodiment implemented in software, and also not requiring the physical networking roundtable of the invention, this alternate app nevertheless requires face to face contact and at the same time, forces a time limit between users to ensure that each participant has an equal opportunity to chat, face-to-face, with other members. In this embodiment, in a first step, the system confirms the presence of all participants through a physically present registration step. In this step, id is verified such as via a finger id scanner which scans and reads all participants on a host touch screen device, such as a smart phone. Alternatively, and preferably, instead of the scanning of a finger print, each event creates a unique event code for each participant and provides that code only to each participant. Consequently, roll call is made by a host inputting each unique code into his host computing device. The system then knows who is present. The system then starts the process of matching pairs of participants or any group composition which the host requires. The matchings are made, and the participants in these smaller match groups are given a certain length of time to interact with each other. The system generates codes or other inputs sent to one of the members, and requires that the other members input that code or other input in order to continue the networking session. This ensures that the groups are actually engaging with each other and not simply taking more time with the prior matched person. An alarm may be generated where the cross inputs are not input correctly, indicating a violation of the order of the networking session. Where there is a violation, the system may exclude these violators from the current round of networking, allowing those who are interacting properly to continue. Violators who routinely violate the rules may also be excluded from continued membership in a community or a group. In this manner, systematic and orderly connection with others is a criteria which can be used to determine a "winner" of the matching round. The winner could receive a free drink, or a promotional item from a sponsor, for example. Of course, voice recognized translations may be made as discussed herein, to facilitate communication between those who speak different languages.

In any configuration, a user may signal, via an indicator on the console of the device, that the conversation will be recorded, giving the other party a means to provide his approval, and providing the option to transmit contact information. By selecting the recordation option, a user has the opportunity to memorialize the contact for reference (for sentimental, recollection or evidentiary purposes), and to dissuade anyone who might be verbally abusive, possessive or forward from continuing contact with the user. When the system is on a "record conversation" mode, the other party is asked to confirm their agreement to the recording, via the recording of a verbal OK or by indicating the same on an input device (e.g., touch screen) on their console next to their seat or on the computer (e.g., smartphone) by which they are connected to the system.

Optionally, participants may be provided with a user ID after an online or local registration step, in which characteristics of the participant and of any desired contacts are registered. The system may, via the touch screen, then indicate to a user who has properly disposed themselves on the system what the characteristics are of those others who have also properly disposed themselves on the system, optionally displaying common or sought out characteristics to the user, together with the name and other biographic information as memory aids during the conversation.

In one embodiment, disposition devices may have a display which indicates the type of person which is expected to dispose themselves on a disposition device, such as investor, entrepreneur, girl or boy, employer or candidate employee, tour agent and potential tour customer, etc. The invention may ideally be configured to allow wine producers to engage with potential consumers of their products in a wine tasting round, for example.

Figure 14:
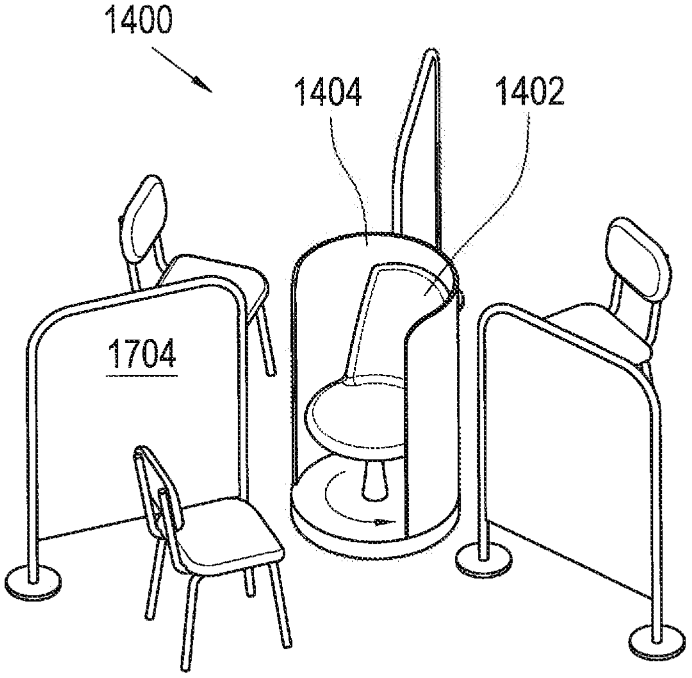
FIG. 14 is a perspective view of the simplest possible variant of the invention, in which a single central seat, preferably with privacy baffles, is turned to successively or according to commands of the controller, dispose that person before other persons in fixed disposition devices.

Referring now to FIG. 14, the simplest possible variant 1400 of the invention includes a single central seat 1402, preferably with privacy baffles 1404, which seat is turned successively or according to commands of the controller, to face other persons in fixed disposition devices. Suitable 3-D baffles are Soundwave® Village by OFFECCT, Inc. of Tibro, Sweden, although 2-D baffles may be used. Other suitable products are described on the World Wide Web, bueroteam-hamburg.de/trennwand-akustiksysteme. A visual or audible message may then be emitted by the system, such as the command "Say hello".

Of course, an embodiment of the invention could comprise more than one moving disposition device, such as adjacent moving devices which move as a gear engaged with a corresponding gear of a gear train, concentric or one next to another, in any arrangement which circular gears are known in the art of transmission drives may take. Alternatively, in another embodiment, each disposition device may have independent motive power and so be adapted to independently find another disposition device in which is disposed a participant that is a potential match for the user.

Figure 15:
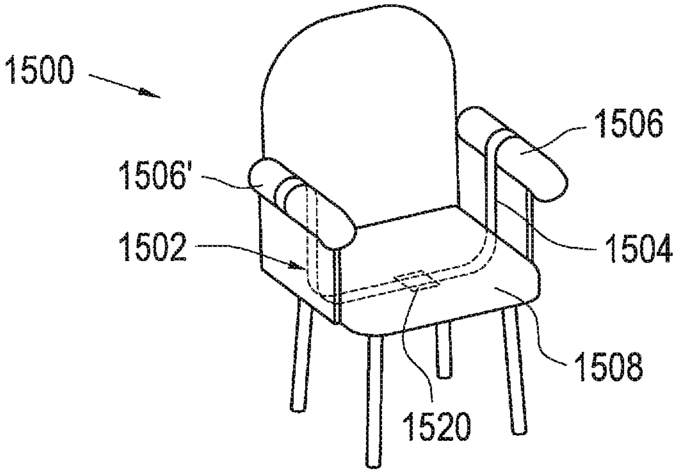
FIG. 15 is a cross sectional view of a weight sensor arrangement used in the instant invention.

Referring now to FIG. 15, in a weight sensing embodiment 1500, a weight or strain sensor arrangement 1502 is used in the instant invention. In this embodiment, a cord 1504 extends from an armrest 1506, then below the seat 1508 to an opposing armrest 1506'. The weight or strain is sensed by a scale or stain gauge 1520 attached to the cord 1504 and sends the sensed weight or strain to the controller, thereby providing inputs useful to estimate whether someone is in the seat or not. Such arrangement is preferably embedded in upholstery so that it is not visible. It may also be disposed under the seat. The controller may be calibrated to sense an amount of weight comparable to that of a person, to avoid false indications such as the presence of a coat or some other item. A mere presence indicator, such as a laser beam (for example, wherein the laser emitter is mounted on one arm rest and directed to a sensor on the other arm rest) broken by an obstacle which is the person occupying a disposition device in the system, may also be used, which indicator however cannot sense weight (unless located under the seat and calibrated so that it is broken only after the seat moves downward under the weight of the occupant to block the laser beam). Weight further indicates gender, and so can be used for the system to "guess" whether the person seated is a man or a woman. Proximity sensors below each armrest may also be used to sense the proximity of the thighs of the users, even the movement of the thighs over time, and compare that profile with typical profiles for men and for women, optionally using AI technology or deep learning methods, thereby allowing more accurate estimation of whether the person seated is male or female. Of course, a simple indicator or switch may be thrown by the person seated indicating whether they are male or female, this input, or the estimation from the weight measurement or proximity input of the thighs, being available for use by the control algorithm for matching persons who take a seat on the system of the invention. Facial recognition software may also be used to estimate the sex of the participant.

Figure 16:
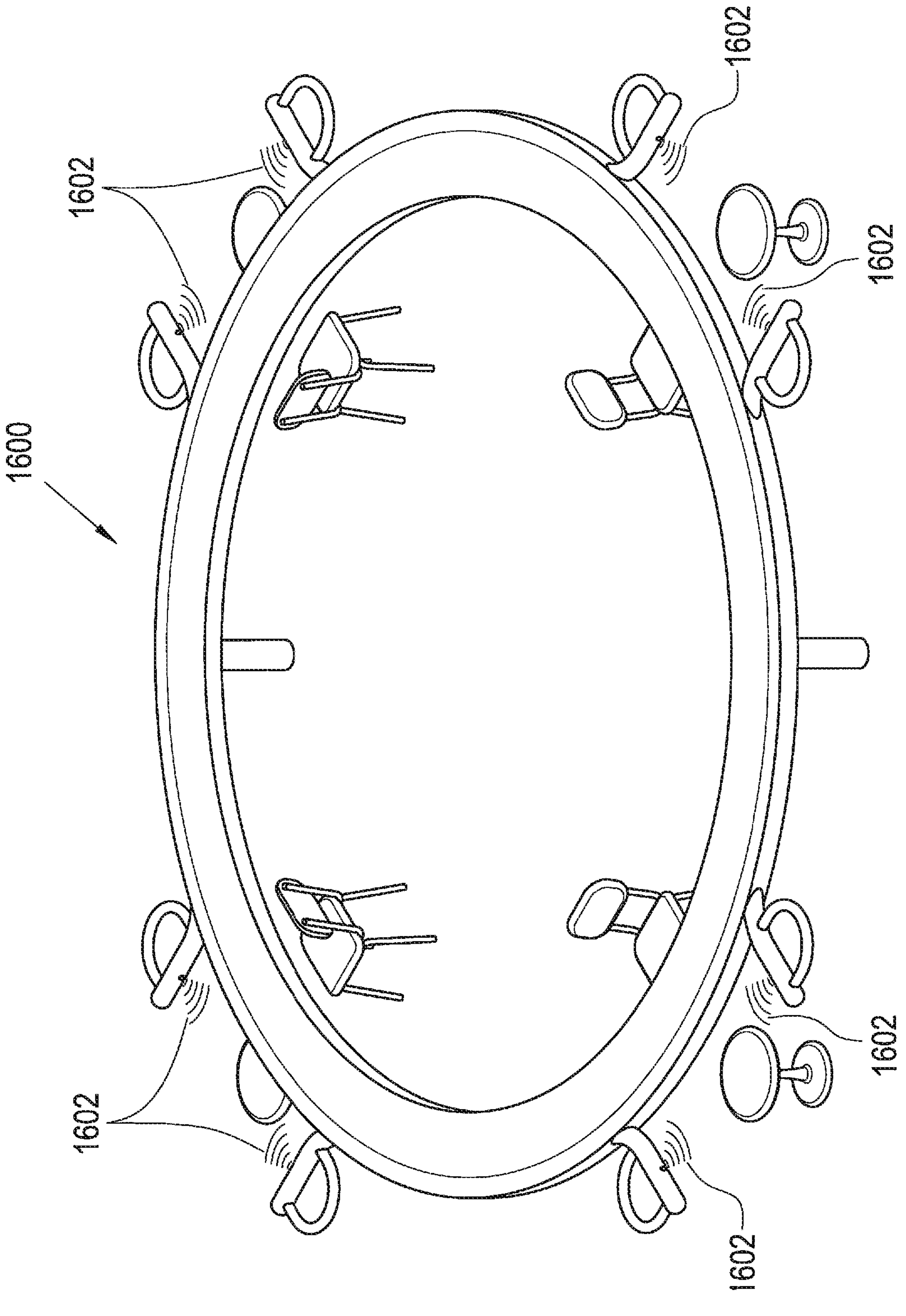
FIG. 16 is a perspective view of another embodiment of the invention, similar to that disclosed in FIG. 11, but using a wireless proximity sensor between a base unit and a mobile unit that sounds an alarm when the distance between the same exceeds a certain distance, encouraging participants to respect their rendezvous while not physically moving any participants.

Referring now to FIG. 16, another embodiment 1600 of the invention is similar to that already disclosed in association with FIG. 11, but using a wireless proximity sensor 1602 mounted on a mobile or base location (in this example, on the mobile location) to sense proximity between a fixed person and the mobile unit in order to sound an alarm when the distance between the same exceeds a certain distance, encouraging participants to respect their rendezvous while not physically moving any participants.

Figure 18:
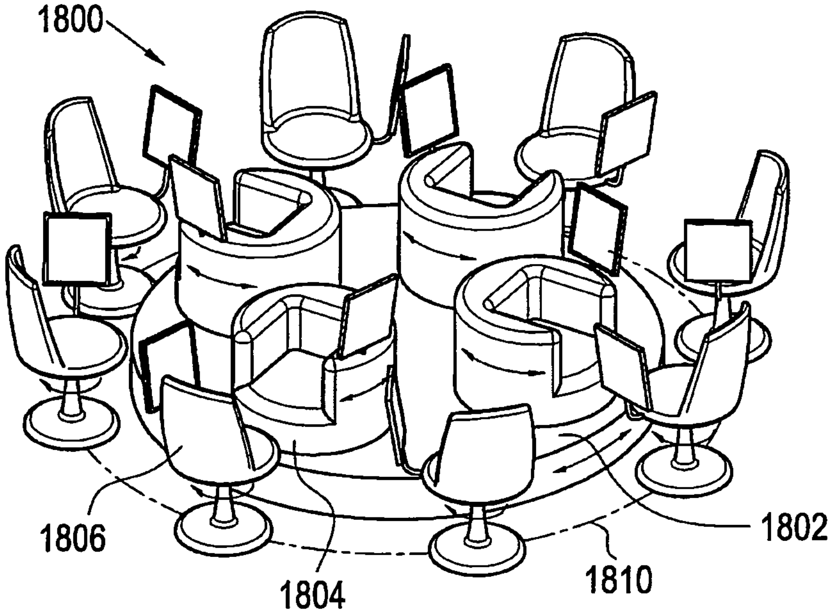
FIG. 18 is a schematic view of yet another embodiment of the invention using a rotating platform supporting rotating chairs.

Referring now to FIG. 18, another embodiment 1800 includes a rotating platform 1802 on which central, rotatable seats 1804 are located. The rotation of the seats 1804 located on the rotating platform 1802 can be automated (via a controller controlling a motor built into the seat or in the rotating platform itself) and synchronized with the movement of other seats to permit those participants sitting in seats 1804 located in on the platform 1802 to meet others to their right or left. In any case, if a person located on the rotating platform 1802 wishes not to face a person sitting on a seat 1806 of the outer ring 1810 of seats, he can manually (or by activating the seat to turn via a motor) cause his seat 1804 to rotate away from that person for the duration of the time that the seats would otherwise be face to face.

Figure 19:
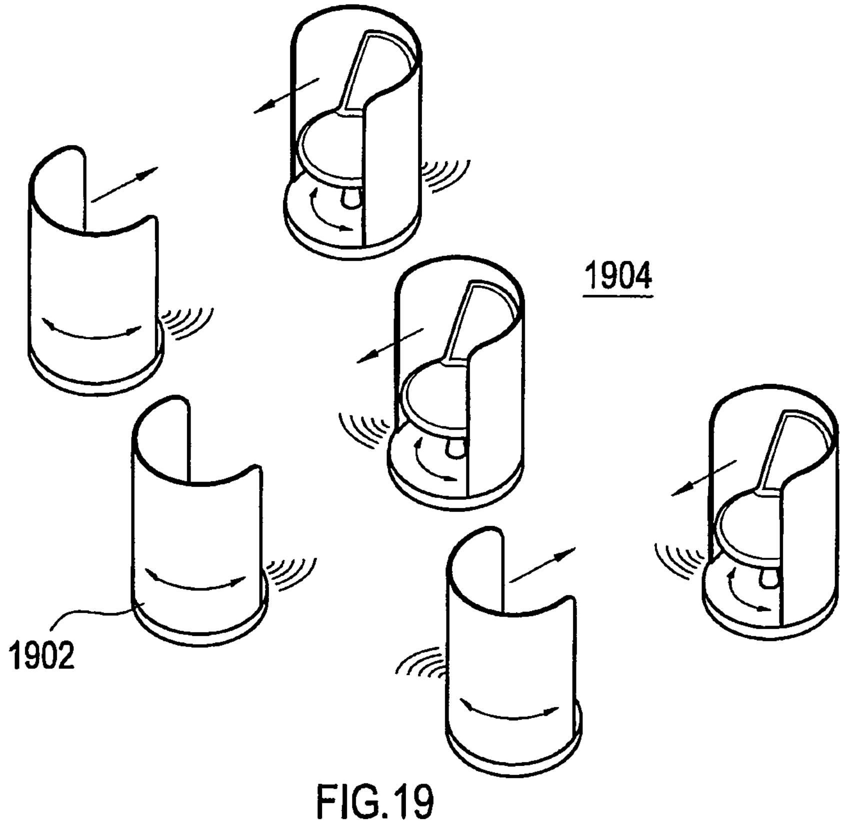
FIG. 19 is a schematic view of still another embodiment of the invention using rotating chairs disposed in an array.

Referring now to FIG. 19, in a simpler embodiment, the system 1900 is made up of rotating seats 1902 laid out in an array of seats (here, 6 are shown but there is no limit to the number of seats) on a floor 1904. Such seats 1902 preferably include a wireless communication device 1906 such as Bluetooth which allows communication and thereby coordination of rotation between the seats so as to match persons face to face. Other means, such as proximity sensors, laser optical communication, laser light pulses, or cable or mechanical connection under the floor may be suitable substitutes to the wireless Bluetooth connection. The communication between seats 1902 should include a seat identifier, which uniquely locates the seat in a seat map of the array. It typically would need to communicate the relative rotational position of the seats as well. Then, as the system knows where the seats are and what seats are adjacent them, a controller controls the rotational orientation of each seat to, to the extent possible, place the person seated in each seat in a position facing another person seated in an adjacent seat. After a set amount of time, the controller rotates the seats to change the face to face relationship to allow each person seated to face and to engage in conversation with another person. As the occupancy of each seat is sensed, the face to face relationships are made between those persons in occupied seats, as it makes no sense to place someone in contact with an empty seat. The seats 1902 sense when someone leaves the seat 1902, and when another, having a characteristic (weight, or ID) that differs from the prior occupant of the seat takes the seat so as to allow another match to an adjacent seat. In this embodiment 1900, the floor 1904 is typically custom made to allow for power to each chair 1902. The floor 1904 may of course have channels for wiring which transmits control signals to each chair 1902 to orchestrate the movement of the chairs to maximize contacts, to accommodate audio headsets, and, where a user requests that a contact not be repeated, to prevent a later match (until the seating senses that one or both users have left their seat). The floor may be transparent or translucent, multi-colored, backlit, and or decorated with colored LED lighting integrated in the floor.

Figure 24:
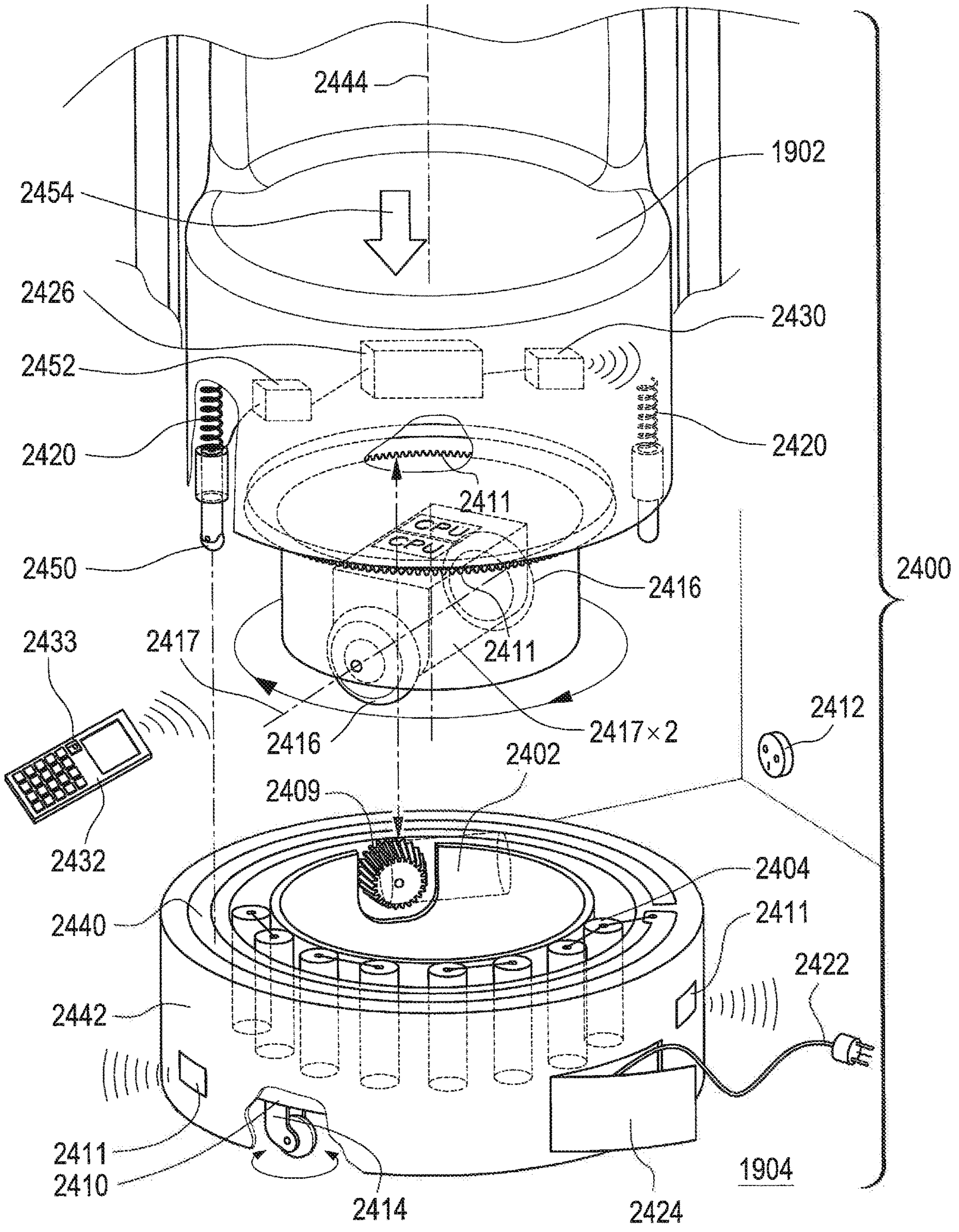
FIG. 24 is an exploded view of the seat of FIG. 19.

Referring now to FIG. 24, the seat 1902, dubbed a networking assistant or intelligent seat 2400, may include a motor 2402 that is powered preferably by a battery 2404. Thus, the hollow floor having channels can be avoided as no hardwired connections are required. For charging, and to facilitate manual movement (rotation, repositioning or a combination thereof), although motorized translation along the floor 1904 is possible, the device may also simply be set via a disengagement mechanism (that may lock swivels 2410) to neutral (or disengage from the motor 2402, for example by springs disengaging the device when the weight of an occupant is removed), in which state the device can be easily pushed or pulled toward a wall having an electrical outlet 2412. In one embodiment, this involves three or more swivelling wheels or casters 2414 which support the weight of the device such that that drive wheels or rollers do not touch the floor and are therefore not engaged when the seat is not occupied. However, when the weight of a person is added, springs 2420 are contracted and drive wheels 2416 extend downward relative to these support casters 2414, against the floor 1904 and so now are able to drive the device via frictional interaction with the floor. The drive wheels 2416 themselves may be controlled or steered with the result being that when such a disengagement mechanism is used, another motion other than simple rotational motion may be imparted (in fact, two parallel wheels 2416 driven at differing rotational velocities (typically by two separate motors) provide for steering and translation of the device with the platform 2442 free to roll in any direction on swivels 2414. As with the conveyer system mentioned earlier (FIG. 3), the seat 1902 may then be controlled to be driven along a path, any path permitted by the support structure or floor 1904 for that matter. A charging cable 2422, preferably stored in a compartment 2424 in the device, preferably retractable, may then be extended a short distance and plugged into the electrical outlet 2412 for charging. A controller 2426 has wireless communication device 2430 capable of communicating with each seat 1902 and operating a remote controller 2432. Where the seat 1902 is fully automated, including being adapted to receive information useful for making matches via a smart card or via access to online profiles of participant, it serves as a moderator or a sort of “mutual friend” that knows the other participants and can move the device 1902 to a juxtaposed position to another seat supporting a participant of likely interest. Note of course that the matches made now need not be made between adjacent seats, but rather between seated participants whose profiles are likely to generate a particular match, preferably using AI technology to determine the most efficient matches. This allows the system to make the most likely successful contacts in the least amount of time. Note that although gear 2409, the motor 2402, and rack 2411 are shown in the figure, they are not strictly required with the wheels 2416 are independently driven by another motor (not shown), as rotation in opposite directions of these wheels will cause rotation of the chair. Rotation of these wheels 2416 in the same direction will cause translation of the chair. Indeed a simpler device will not include the gear 2409 or rack 2411.

Figure 28:
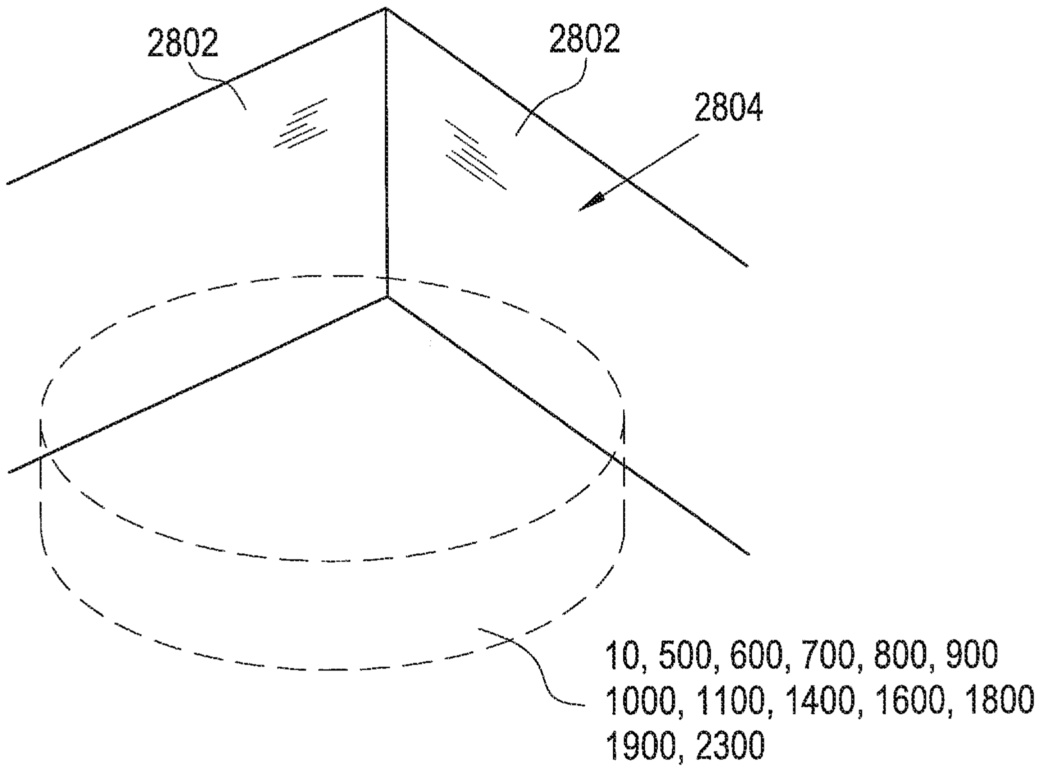
FIG. 28 is a perspective view of a setup of the invention.

It should be clear that each seat 1902 must be able to find or to reorient itself toward a target, based on the viewing direction of the occupant. This can be accomplished by providing a mechanism in the device that allows the device to find an absolute home position with respect to any objects to be viewed such as adjacent seats or video displays (see FIG. 28) in the room 2804. Where little magnetic inference is expected, such can be accomplished using a built in compass that faces the seat to north as a home position. GPS may also be used to provide inputs necessary for repositioning the seat. Preferably, the seats 1902 are arranged in an array on a floor or operational surface. The seats preferably have transceivers that transmit and receive signals to and from the controller. The floor includes an array of markers (not shown) that transmit location signals, arguably via active RFID signals. The seats 1902 emit a signal capable of exciting and reading RFID signals sent by the markers only a certain distance away from the seat. The seat’s emitted signal excites the location markers and causes them to send a signal back to the seat, which combines the ID of this marker its own ID and sends this to the controller, preferably via wireless. For each seat 1902, the controller has marker ID information which locates the seat relative to the markers and, in this way, the location of each seat can be determined. Alternatively, each seat ID is associated with a corresponding market ID. Marker RFID signals emitted by excitement thereof are triangulated on by the seats 1902, thereby allowing the seats to find a home position on the floor. The markers can two or more beacons which, through calculation based on the inputs of the known beacon locations and triangulation techniques, helps the system know where each seat 1902 is. The markers can be embedded in the floor, on the floor surface or even suspended from the ceiling or from overhead support cables traversing the operational surface (dance floor). Each seat 1902 may be adapted to take a home position corresponding to the location of an associated marker. In this way, differing choreographed routines can be performed from a known start location.

In one embodiment, the seat 1902 includes an “approach” feature which upon selection (either by the controller, or by the occupant of the seat), advances the seat toward an occupied, facing seat after the device had rotated itself to face the adjacent user in order to make communication easier. After the predetermined time of engagement, the seat withdraws to its initial position.

In still another embodiment, the array of seats 1902 are controlled by the controller in a manner that can be compared to a dance, in which the length of the song determines the time that each matched pair is engaged. As with dancing, between songs, partners may be exchanged. Because a signal is sent to the controller when a seat 1902 senses that a person is occupying the seat, the controller knows how many participants there are at any given time. Because each seat 1902 is adapted to communicate its occupancy status, and because the controller knows where each seat is, the controller, optionally applying AI technology to determine among options the best configuration, chooses from a group of pre-programmed "choreographed" routines that best serve the intended purpose of the engagement. Seats that are not occupied may be withdrawn, optionally, automatically from the "dance" floor, or via a live caddy charged with removing inactive seats 1902 from the "dance floor". Those occupied are applied to the chosen choreographed engagement routine.

Where the seats 1902 do nothing but rotate with respect to a fixed base whose orientation has been set to a known orientation, a resistive ring 2440 (such as a slip ring made of conductive material) centered in the seat can be used. Preferably this ring's periphery is outwardly disposed in the fixed foot 2242 yet invisible, located under the seat adjacent the floor 1904. The seat 1902 is mounted on a rotating axis 2444 rotating about an axel or on a ring ball bearing on a platform 2442 which is frictionally engaged with the floor on one end. This fixable platform 2442 preferably encloses the battery 2404, the weight of which proving stability to the device. An electrical connection is made from the battery to one end of the resistive ring 2440. A rolling or sliding electrical contact 2450 attached to the seat 1902 makes electrical contact with a conductive, exposed surface of the ring 2440 at different points along its periphery. Given that the length of the ring 2440 through which current has to pass varies, differing resistances are read out by the resistance measuring device 2452. This resistance measurement is compared with known resistances in for example a table for differing positions in order to determine the current relative rotational position of the seat 1902 (i.e., it's pointing orientation) with respect to the platform 2442 which is engaged with the floor 1904. If the platform 2442 is oriented to a known position at setup of an array of such seats, then a controller 2426 will know where each seat 1902 is pointing, and can control the forward and reverse rotation of the wheels 2416 through a control loop to move the seat to any relative desired rotational position. The resistance of the facing direction 2454 and other positions is known at points along the ring, thereby allowing the device to know its rotational location with respect to a base.

Figure 20:
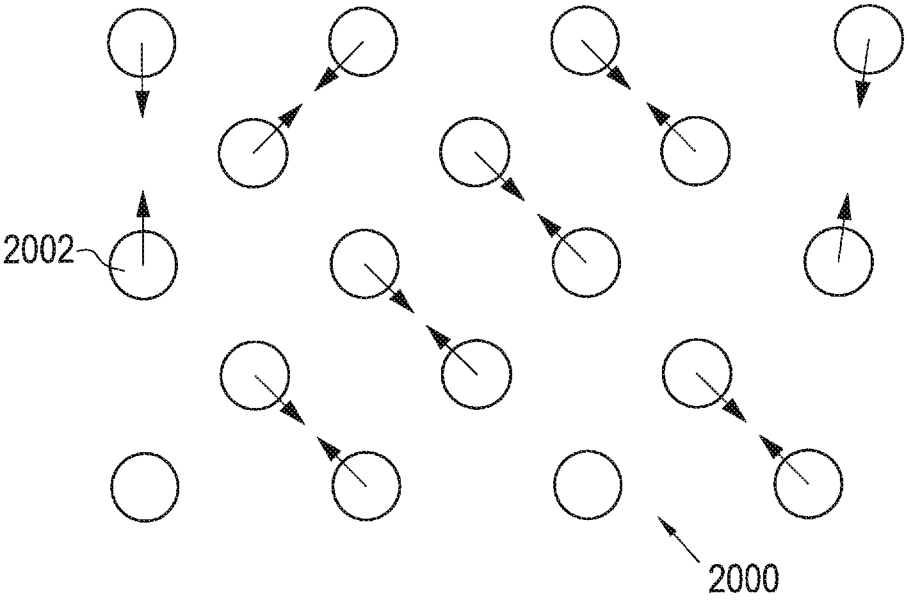
FIG. 20 is an example of an array of the rotating chairs of the invention.

In the above arrangement, where user seats 1902 rotate in orchestration with other seats, the arrays may be of different configurations. In one embodiment, the seat 1902 includes an "approach" feature which upon selection, advances the seat toward an adjacent seat after the device had rotated itself to face the adjacent user in order to make communication easier. After the predetermined time of engagement, the seat withdraws to its initial position. Referring now to FIG. 20, one possible array 2000 is shown. It can be seen by the arrows 2002 how matches can be made. Any number of possible variants are possible.

Figure 21:
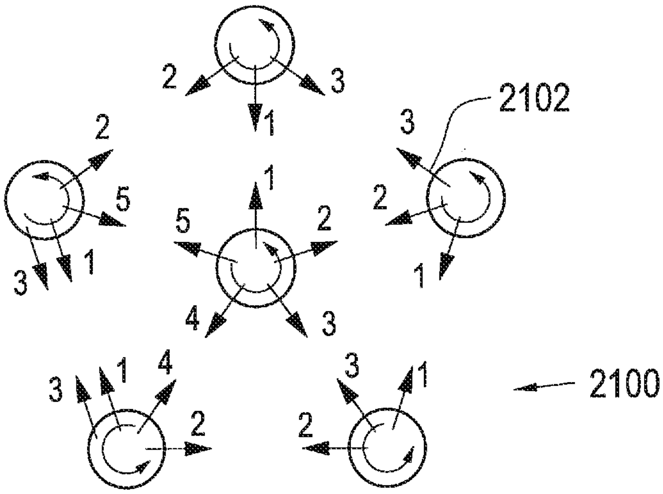
FIG. 21 is another example of an array, showing sequential matches.

Referring now to FIG. 21, an array 2100 of 6 seats 1902 are shown. The arrows 2102 have numbers associated with them which indicate 5 alternate configurations 1-5, that permit a suitable number of contacts to be made between adjacent seats 1902.

Each seat of any embodiment of this invention may have a card reader which reads an ID card encoded with name and profile information, including information marked as able to compare and share with other participants, further optionally including the goals of that user (networking, dating, friendship or learning). The ID card is electronically readable and may be a magnetic card.

The system may include any number of programs/protocols/algorithms (PPAs) for making contact with adjacent (or even non-adjacent) seated participants. It may also include PPAs for directing the attention and so orientation of all (or selected) seated persons to a particular focal point or area. Such focal point may be set to that of the location of a speaker or moderator. It may also be set to direct some or all toward a particular video screen, in one embodiment, a video screen mounted on a wall. A PPA may then orient each or some toward one video screen presentation on one wall and then later to another wall. This permits those who enter the presentation space to enter when they wish. Once they sit in a seat and place their ear or headphones on, they are directed to the first of a series of video presentations, following sequentially to the next until the presentation is finished. This leads to a more immersive experience for users and is particularly useful for introductory videos in, for example, a museum. However, unlike the conventional museum theatre, where people have the opportunity to attend a one hour presentation only once an hour, using the invention, a participant is allowed to enter essentially at will and not have to wait until the entire presentation begins again (the presentation being divided into a number of segments, for example, corresponding to the number of wall mounted video screens).

In another advantage, it can be appreciated that elderly persons may use the device to be toured through a museum or other exhibit when the wheels 2416 are controlled to permit translation. This may also have a benefit to those who are not physically handicapped, to force a flow rate of visitors through a museum, thereby avoiding clutter and "traffic jams" at particular points of interest in the museum. This also enables the seats 1902 to provide information about the exhibits when the system calculates that a seat is adjacent the particular work of art. Where security is an issue, the system enhances security by ensuring a proper distance from a work of art, where, for example, leaving the seat causes an alarm which might indicate that a theft is being planned and should be thwarted.

Figure 22:
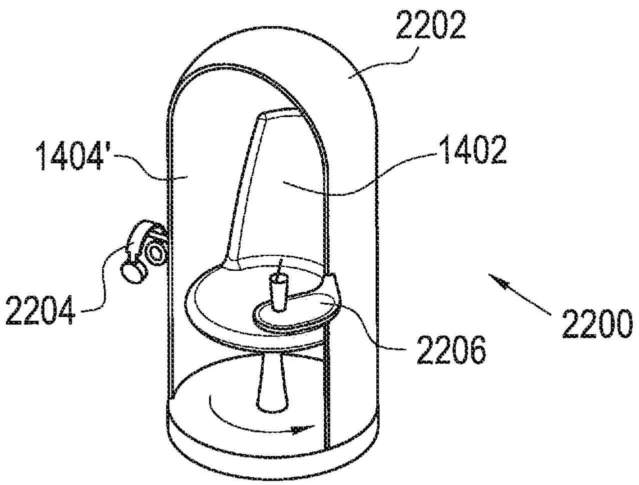
FIG. 22 is a perspective view of a rotating chair of the invention with a sound gathering bonnet.

Referring now to FIG. 22, an embodiment 2200 of the invention is shown, where the rotating chair 2200 includes a sound gathering/isolating bonnet 2202, which is preferably transparent so as to minimize blocking of the view by adjacently seated participants. The chair optionally includes audio earphones and a holder, which optionally has channel selection for different languages. This pod or chair 2200 is shown with a flat surface 2206 to conveniently rest a drink or snack.

Figure 23:
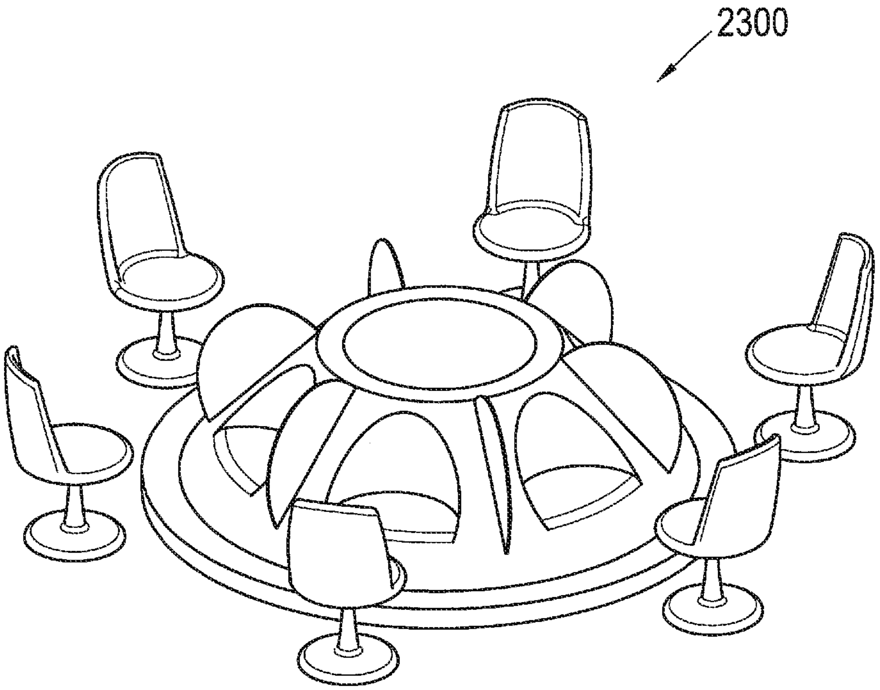
FIG. 23 is a perspective view of another embodiment of the invention.

Referring now to FIG. 23, an embodiment 2300 of the invention is shown where the rotating couch resembles a UFO, which in this context could mean Unlimited Friendship Opportunities.

In another embodiment, the invention does away with seating altogether. In this embodiment, the invention consists of units encoded with software, and which are worn by the users involved, the units including proximity sensors to units which a match has or is to be established, which, after a time period allowing conversation, will sound an alarm until the units are separated a certain distance, forcing the participants to break off conversation and seek their next match. In one embodiment, provided that smart phones develop the ability to sense their relative proximity to another smart phone, the unit is a smart phone encoded with software. The units read biographical information of members that are within proximity to one another. When the units of those who are to be matched approach each other, the proximity sensed through these proximity sensors decreases, then the units indicate to their user that the match is near and when within a certain proximal distance, the indication stops or is silenced until the end of the time period, at which time, an alarm sounds again until the matched persons separate a certain distance. As already indicated, in this embodiment, seating or moving furniture dedicated to the system is completely done away with, requiring that the participants move themselves to make a match.

The invention, as is evident, has unlimited applications.

For a typical speed dating engagement, persons may subscribe, pay a fee, and share their information online. Once at the event, the participating and subscribed persons may be given an ID number or an ID card (encoded with an identifier for that person, and optionally including all their subscription information, including their characteristics and interests and those of others which they seek to make contact with), which when inserted into a card reader of the system, registers their information and allows common interests to be identified between users, and optionally displayed to the users at will, but particularly during the match as hints for conversation and as memory aids. At the end of the event, such cards can be retained, or turned in for re-use.

In a variant, a contact game may be played using the system of the invention, in which sets of questions which, near the end of their time-limited contact but prior to indexing to the next person, are presented to the user for answering. The questions are directed at the other person just contacted and are of a manner such as the following: "Now that you've met this person, how would you answer the following questions? Note that the person you'll be answering these questions about will be asking and answering the same questions about you, and you're answers will be graded based on your contacts own responses about themselves. The person who gets the most answers correct wins the game. Here are further sample questions: 1. This person is likely to flee for their lives when confronted face to face with a hungry grizzly bear. Y/N. 2. This person has much in common with Indiana Jones. Y/N. 3. This person prepares tea by putting milk in the cup first before they add hot water. Y/N. 4. This person goes with the flow of his or her surroundings. Y/N. 4. This person spends more time than you in front of the mirror every morning. Y/N. Preferably, the questions are provided such that they can answered with a simple yes or no. A tally is made of whose answers best matching the answers of the facing contacts and a prize coupon or other reward is issued to the person or persons with the highest score. This embodiment brings the interest of a video game together with the rewarding nature of traditional personal face to face contact.

In a variant applicable to all variants described herein, the system including a recommendation or matching engine, the invention operates on or is integrated in a social media service like "FACEBOOK®, "LINKEDIN"® or "XINGT"™, "MEETUP"™ and "GOOGLEPLUS"® to compare user biographical data and, based on preferences and permissions, recommends connections so as to facilitate face-to-face meeting opportunities. Of course, as used herein, a "face-to-face" meeting can be a physical face-to-face meeting or a virtual face-to-face meeting held via video conferencing or via live chat. However, it is preferred to place users in physical face to face contact so as to have eye-to-eye contact when meeting. First the recommendation engine (RE) needs inputs from users to be effective. The following are inputs that are considered by the matching engine: (1) user profile info; and (2) opt-in, providing permissions for comparison and recommendations. The RE makes comparison in order to generate recommendations for connection and/or for face-to-face meeting. Popups or in- or emails may then be sent to inform of possible matches, asking permission to set up a face-to-face meeting. If permission is granted, the RE contacts others and seeks a suitable meeting time. The RE sends a meeting proposal, much like an outlook meeting proposal, giving the user the ability to RSVP thereby adding to his calendar. Reminders of the upcoming meeting may then be sent. An evaluation form may also be sent out after the meeting and connections are proposed once again.

Populating a profile of inputs for effectively compared with other users in an efficient manner is not straight forward. Free-style inputs can be used but would require high processing power to apply what might amount to Artificial Intelligence algorithms to determine the meaning of the input phrases and determine whether the inputs are positive to a particular input or negative. For example, someone may input that they hate skiing or skiers (or that he hates persons who hate skiers). An algorithm of the recommendation contact engine may pick up on the activity skiing, but not properly attribute the negative aspect to this input, thus risking matching someone who loves skiing with someone who hates skiing. Consequently, the recommendation contact engine best analyses the inputs and displays an input window asking follow up questions about the inputs to determine whether the author is positively or negatively disposed to the input activity. For example, the recommendation contact engine scans the free-style phrase to identify the activity, in this example, skiing, by comparing words ending in "ing" with a list of activity words stored in memory. If a match is found, the recommendation contact engine displays a further input window together with a follow-up question to the user seeking input (assuming g the he's given permission to compare such profile information), such as "you've written about skiing, right?" If the answer input is "yes", the recommendation contact engine displays a further input window together with the follow-up question "are you positively or negatively disposed to skiing? Yes, or no" If positively disposed, then this input is saved for comparison indicating that the person is positively disposed to skiing. If negatively disposed, then the indication is that the person is negatively disposed to skiing. The recommendation contact engine then displays a further input window asking the follow-up question "are you a good skier, yes, or no?" The inputs populate a table with lines or columns representing the activity, and further inputs that are discernible populate data fields associated with the activity. Spell check can be run on the free style inputs to ensure that the input is grammatically correct and will be understandable to the system. Where errors are detected, correction can be required before the inputs are saved for later comparison.

A user uses user settings to provide, from a drop down menu, for example, permissions required to allow the recommendation engine to compare the profiles of users and to recommend contacts of those having matching profiles.

The proposed matches can be made based on weighting indications provided by each user of the importance of common characteristics sought by each user. Location, for example, may be critical, particularly where the participant may only have access to public transportation. Hobbies or religion may be another. Experienced sociologists, psychiatrists, and/or psychologists may create a questionnaire whose questions they weight based on the importance of the answer to determining compatibility with another member. Based on user permissions and preferences, including whether or not the user wishes to participate in a networking event during which the user can meet those persons in their geographical area interested in meeting them, a user is provided with meeting times and places for meeting others with similar interests (i.e., suggested contacts). Promoted and propagated for example via franchising, social media enabled Cafés (e.g., "FACEBOOK"™ cafés) may be established which offer the invention as a means of putting people with similar interests in contact in a fair and orderly way, avoiding the annoyances of attempted monopolization (or harassment) by pushy users and giving shy persons (50 percent of the world's population) equal opportunity. Preferably, these cafés would have at least two meeting areas, one for walk-in visitors who might which to "roll the dice" and see who they might meet in this manner, and another for those who the system of the invention suggests matching. The invention gives each user the opportunity to meet each person before allowing the person into their network or friends and family circle. In this manner, abuses of the network can be minimized.

Alternatively or together with the features in the above paragraph, the invention provides a means for a user to permit the sending of written or e-invitations to physical meeting events that may be of interest to the user, and may indicate how far away from the user's local the user would be willing to receive such invitations. Optionally, the user can indicate that her or she intends to be at another location at a certain time or during a certain period of time, and may search events of potential interest at that time. The user, based on permissions provided by him and/or other users, may also be provided with means of meeting others having common interests in the or place of meeting which the first user intends to visit.

Optionally, the system of the invention, after face to face contact has been accomplished, logs the event for consideration in a KPI ranking the user, providing the opportunity to reward him for this physical, social interaction, and may also remind the user of the contact and solicits a "thank you" and/or a connection request. With permission, a log of the locations of physical contact may be stored for future reference.

It should be appreciated that many applications of the present invention may be formulated.

In another embodiment which seeks to match persons, facilitate contact and optionally create communities, the system and method of the invention includes several steps. In a first step, the system and method registers user profiles, optionally including ascertaining other user characteristics that the user is willing to connect with (e.g. mountain climber, age 25-35, living in a certain city or area). In a second step, the system and method optionally obtains permissions to compare profile and suggest connections, also with those who fall under criteria for user connection; and for what can be revealed to other possible matches. In a third step, the system and method, over time and in the background, compares user profiles by comparing profile inputs such as age, sex, city of residence, hobbies, etc. and/or user input characteristics of persons sought for connection. In a fourth step, the system and method indexes/flags most frequent, useful (such as having at least 3 but typically many more, matching characteristics) match criteria found in the comparison by assigning an index number or most frequent match identifier classification (hereinafter "code") to users with corresponding matching characteristics, such as according to a registration questionnaire questions, for example, age range, race, education level, profession, etc., thereby categorizing users via the indexing into smaller communities of users having common profile information. In a fifth step, the system and method suggests connections between members sharing the code, optionally providing user the ability to search based on location of users including in a generic or confidential manner (e.g., do not reveal names, providing menu option selectable listings) including further at least an option of brokering a face-to-face meeting with the suggested connections by at least some users). In a sixth step, where a brokered meeting by at least some users is selected, the system and method sends a meeting request between such users who've, by their selection or by a profile setting, permitted brokered meetings, soliciting input on possible meeting times, dates, places, etc. In a seventh step, the system and method repeats the above step until agreement is reached between suggested connections on time and place. In an eighth step, the system and method sends out reminders, optionally with an vCalendar Format (*.vcs) electronic calendar file, requesting RSVPs to such brokered meetings, optionally including coordinating with meeting locales such as bars or restaurants or amusements to ensure space availability. In a ninth step, after the meeting, the system and method solicits ratings for each connection, including providing the option of connecting with the attendees online.

Further, during a brokered meeting, the system and method of the invention at least initially limits participating users to a predetermined amount of time of face to face contact with the other users, with each user receiving a turn at the face to face contact, thereby ensuring fair and orderly introductions between users.

The locale or place of meeting in which the system and method are used preferably includes infrastructure which enables the use of the networking software of the invention onsite.

A transceiver may be worn by members, the transceiver emitting and/or receiving the code of the community, optionally emitting the code readable by a lock which unlocks upon reading of the code to allow a code member to enter a restricted area reserved for members with the code.

Face-to-face contact, optionally with the networking roundtable of the invention, may take place in a room whose walls are at least partially, preferably completely covered with a video panels adapted to display images or videos selected by the organizer of the event, a host meeting locale manager and/or the event sponsor, to create an immersive environment therein keyed to the common interests of the community. Preferably all walls and the ceiling, or merely adjacent corner panels and optionally a ceiling panel may be used. Of course, a single panel provides more information and enhancement to a networking event than none at all.

The video devices are video panels that cover at least a substantial portion of the walls and/or ceiling of a room in the premises at which the brokered meeting is to take place.

Using the system and method described herein, the locale or place of meeting reserves and makes available the networking roundtable of the invention, wherein the members seat themselves in the roundtable in facing relationship, and the table turns to alternate the facing relationship, thereby optimally ensuring fair and orderly introductions between users, and to provide matching tools which, based on matches, suggests themes for discussion.

The system and method described herein further may promote the code characteristic of a particular community's attributes within that community, wherein promotional materials such as T-shirts, sunglasses, bags and other items are branded with the code and made available to members of that particular community.

A radio transceiver carried or worn by a member user may transmit and receive the community code, wherein an alarm indicates whether another community member is within a certain area, and which optionally emits the code readable by a door lock to allow a code member to unlock a door to a space or room reserved for members with the code.

The transceiver further may include communication means which, when activated such as via contact with another transceiver, contact details are shared between the users associated with each transceiver, independently of whether the users match the criteria of a community that one or the other is a member of.

The system and method described herein, wherein a directional indicator device is integrated in the transceiver to help direct the two members toward each other to facilitate making an encounter.

The system and method described herein may use a profile database such as a multi-tenant database, wherein each user is a tenant that may run a search on the database to find matches, and is provided with a save results feature, saving the results under a particular community name or code, the code being unique and saved in a column of the database associated with each user, thereby allowing the users to solicit a meeting or meetings among the users found in the search.

Members of the community so formed may run searches on the community limited to a particular location, and thereby be able to set up meetings at any desired location.

A sponsor module may be integrated into the invention. This sponsor module for example seeks sponsors offering products and/or services targeting members of a community having interests which match the codes, and, assuming the size of any brokered meeting is of interest to potential sponsors, a sponsor or sponsors indicating their interest and who contracts with the purveyors of the system to sponsor the meeting is provided with sponsoring options selected from at least one of the group of sponsoring options consisting of:

a. providing custom sponsor banners online on the website of the community for which the code is associated, for a period of time where the meeting is memorialized online for a specified amount of time or for a number of visitors, and b. providing a brokered meeting organizer and/or a meeting host location manager with custom sponsor banners, sponsor videos, samples (including samples for tasting or testing) and/or promotional items (such as T-shirts, mugs, pens) for delivery to the locale or place of meeting prior to the meeting or for display on display devices in the premises at which the brokered meeting is to take place.

In step b, the users displaying the banner or distributing the promotional items optionally do so together with a bar code on the banner or promotional item which when activated, enables the locale or place of meeting to receive payment on behalf of the sponsor for a determined percentage of the costs of the meeting, including optionally the cost of the first drink, or a percentage of all drinks purchased such that the locale or place of meeting can offer a special price such as a happy hour price (for example, a taxi company can offer discounted taxi services to return the participants to their homes). The code optionally being readable via a barcode reader, for example, by users who attend the meeting. The larger the number of users who scan the code (indicating that they've read the banner for example), the more the sponsor pays for such sponsoring opportunity.

Figure 29A:
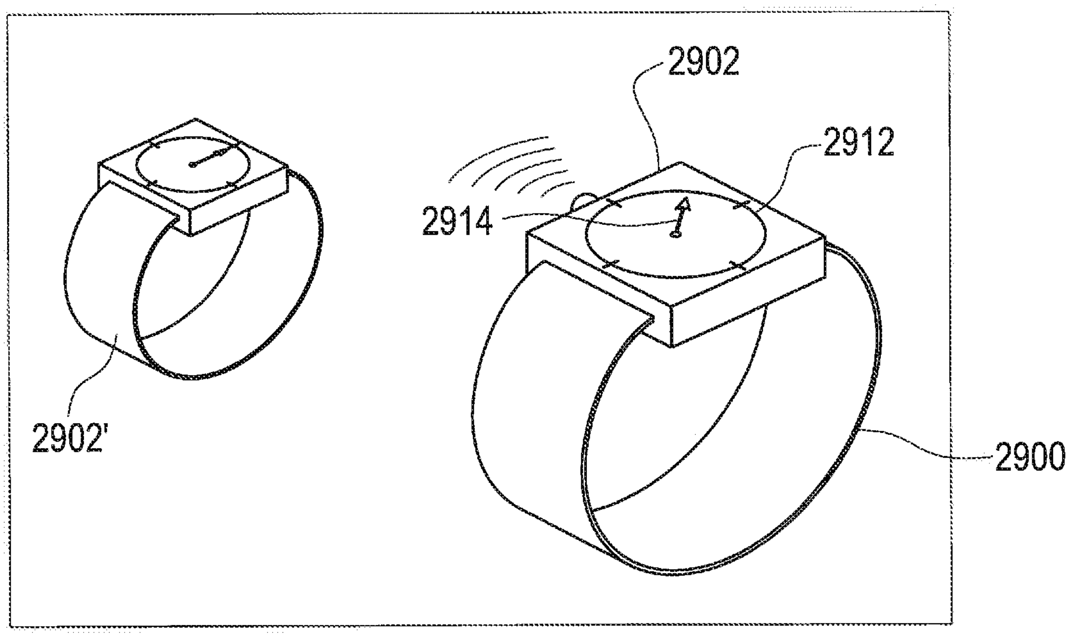
FIG. 29A is a schematic view of a transceiver of the invention.
Figure 30:
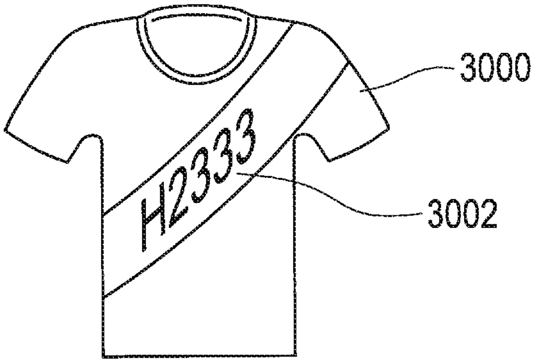
FIG. 30 is a plan view of an item of the invention.

Referring now to FIG. 29A, the community codes or corresponding names 3002 representing these communities may be published embodied in a wearable item 3000, such as on clothing items selected from at least one of the group of clothing items consisting of watches 2900, wrist bands, headbands, T-shirts 3000 (see FIG. 30), shirts, sunglasses, baseball caps, wherein, where the code is not converted into a corresponding name that is descriptive, the nature of the community remains unknown to non-members of the community, thereby allowing users who are members of the community to inconspicuously brand themselves so that they are identifiable by other members of the community.

Figure 29B:
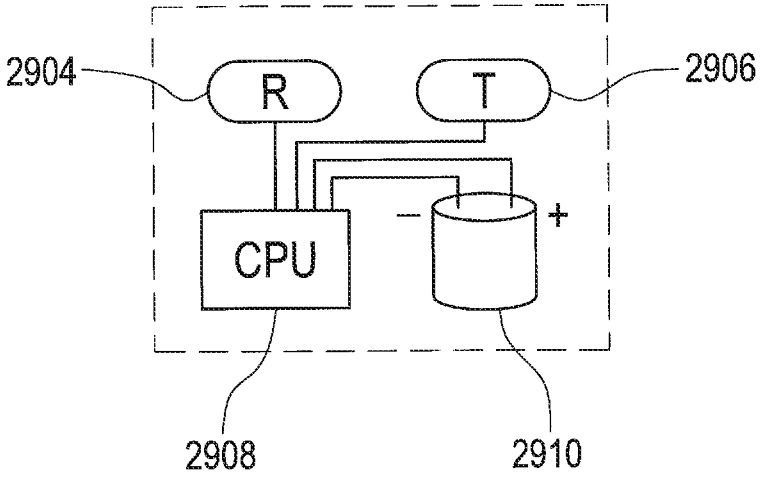
FIG. 29B is a block diagram of the transceiver of FIG. 29A.

Referring now to FIG. 29B, the wearable items may include a transponder and/or receiver adapted to emit and/or respectively receive the code at least by other members of the community, over a given distance range, thereby enabling impromptu contact between members.

A wearable transceiver may be integrated into the system and method of the invention. The transceiver has a receiver, a transmitter, a processor and a power source functionally connected so as to emit and receive a code such as the community code. The transceiver is adapted to be worn by a member of the community having the code associated therewith. The transceiver, in operation, scans a region within its scanning range for the presence of another transceiver emitting the community code, the reception of the code from another transmitter informing the member of the proximity of another member.

The wearable transceiver described herein may further include a direction indicator device having a pointer which, in operation, upon detecting another transmitter transmitting the code of the community, indicates the relative direction which the wearer must travel to approach the transmitter for the purpose of making contact with the wearer of the transmitter.

The transceiver may emit further code information enabling users to better ascertain whether to make the impromptu contact, such further code information selected from at least one of a group of further characteristics consisting of gender, marital status, age range and whether there is a compatible sexual orientation.

A user interested in contacting another user wearing an item displaying the community code, connects to a network having access to a portal associated with all communities and, typically via a URL to the community search input field, search the communities for that particular community, and seek to join that community.

The user seeking admittance to the community may be subjected to a questionnaire allowing the community to ascertain whether the user seeking admittance is compatible with the community and if so, provides a means for the seeking user to join the community.

The code further annotated with an user identifier, allowing identification of the individual user.

A fee may be charged for searching for access in a given community. The fee may be charged commensurate with the stated wealth of the user, thereby excluding the user from a community that requires a certain stated wealth unless the commensurate fee is paid, thereby avoiding fraud in the declaration of stated wealth. A certain fee (of a substantial amount) can be charged to ensure that the member seeking out other wealthy members are themselves wealthy. Membership fees that are commensurate with the stated incomes of the user members provide a revenue stream and minimize the chances that wealthy users will actually be dealing with other members that are not wealthy.

In an aspect of the invention, a community-making engine of the invention includes a keyword analyzer, a classifier adapted to classify the keywords, including indicating whether they are to be published and whether fixed or variable, a comparator, which compares the keywords to suggest whether similar communities exist, a matching engine to check for matches of the user to an existing community and if no matches exist, or only relatively poor matches exist, the engine create a community, assuming that criteria such as moral criteria are met for the existence of the community. In other words, keywords must not be on an exclusion list in order to be able to automatically create a community.

A community-making engine may also be integrated into the system or method of the invention. This engine operates on a database of user profiles, permissions and preferences, over time and in the background: (a) compares user profiles by comparing profile inputs such as age, sex, city of residence, hobbies, etc. and/or user input characteristics of users sought for connection; (b) indexes/flags most frequent, useful (such as having at least 3 but typically many more, matching characteristics) match criteria found in the comparison by assigning an index number or most frequent match identifier classification (hereinafter "code") to users, such as according to a registration questionnaire questions, for example, age range, race, education level, profession, etc., thereby categorizing users via the indexing into smaller communities of users having common profile information; (c) defines communities based on at least three common match criteria comprising at least a certain number of matches; (d) for at least the purpose of connecting users of common interest, suggesting connections optionally based on location of users including in a generic or confidential manner (e.g., do not reveal names, providing menu option selectable listings including at least an option of brokering a face-to-face meeting with the suggested connections by at least some users) and optionally brokering face to face meetings between members; and (e) optionally following up with those members who have met via a brokered meeting face to face, suggesting connections and ratings.

In the registration process for a user of the system of the invention, when input by the user, each requested user's preference for contact-making is saved. The community-making engine analyses all keywords representing characteristics of those with whom they have indicated an interest in contacting. For example, Jane Doe may indicate as follows that she would be interested in making contact with a target group of people:

Male—personal, static (some may argue this is time dependent)
25-30—personal, time dependent
Heterosexual—personal, time dependent
Unmarried—personal, time dependent
College degree—personal, static
Employed—personal, time dependent
Resident of XYZ city—personal, time dependent Because the community-making engine is concerned with creating a community, the engine optionally notes as variables the characteristics that are time dependent, monitoring these variables for changes that would disqualify them for the community. Even if these users fall out of the community, the connections made between members are durable. The members however are informed of the changes that would take the member out of the community, or are simply informed that a variable has changed which places a connected member out of the community, optionally asking each member whether they wish to remain connected, or alternatively, providing a means of disconnecting the connection.

The engine also checks whether there are existing communities that fit the search criteria, or which match most of the criteria, indicating which communities already exist and providing an option of requesting membership in the existing communities. In addition, the user is asked which of their own characteristics they wish to publish or not to publish.

Once created, a search module allows users to search communities for users with additional characteristics, for example, city of residence or region of residence (defined by being so many miles from a city center, for example).

Depending on the number of registered users and the quantity of matches, further communities can be proposed. For example, after Jane Doe gives her preferences for a match, the engine checks whether there are more than a certain number of matches within a given geographical area or distance from the user. The engine then asks if Jane would like to become a member of the community (for which certain use terms are displayed and must be agreed to before becoming a member), which match these criteria starting from the largest number of matches to the least or vice versa. Once an affirmative answer is received, that user is associated with the code for the combination selected and may be contacted according to the contact terms of the community.

A global search and comparison reveals different categories of users. One could say "types" of users, except that some of the characteristics are variable. One thinks of a type of user as something that doesn't vary. Consequently, the preference of using a descriptor other than "types" of users. The size of those categories is defined by the number of common characteristics each possesses. For example, the largest category is human, the next would be male or female, whereas the smallest would be the user themselves. The two extremes, all users and a single user, are not very useful to make searching more efficient or to help find others that match certain profile criteria. Therefore, the categories may be set in a logical manner using psychological information, and will therefore be restricted by at least 3 common characteristics, such as sex, age range, and some other limitation, such as general location (city, distance from a city).

The system preferably uses a multi-tenant database that defines communities, provides members with means to select a community monitor or leader, that monitor or leader having access to the community database of the MTDB.

The networking roundtable in which the locale or place of meeting provides an unlock code that is optionally specific to the locale or place of meeting of the brokered meeting, such unlock code being provided at a specific time period during operation of the networking roundtable, or only after a certain number of connections are made, the unlock code unlocking a feature of the software which enables connection via a smartphone or tablet with the users who signed up to the brokered meeting. Depending on the requirements set for unlocking, a unlock sequence or requirement can be found that encourages attendance at the brokered meeting and/or enables those who attend a brokered meeting and optionally, those who use the software or the networking roundtable of the invention at the locale or place of meeting during the networking time period to connect to each other using the software of the invention in order to ensure fair introductions before being permitted to get to know the invitees.

Figure 27:
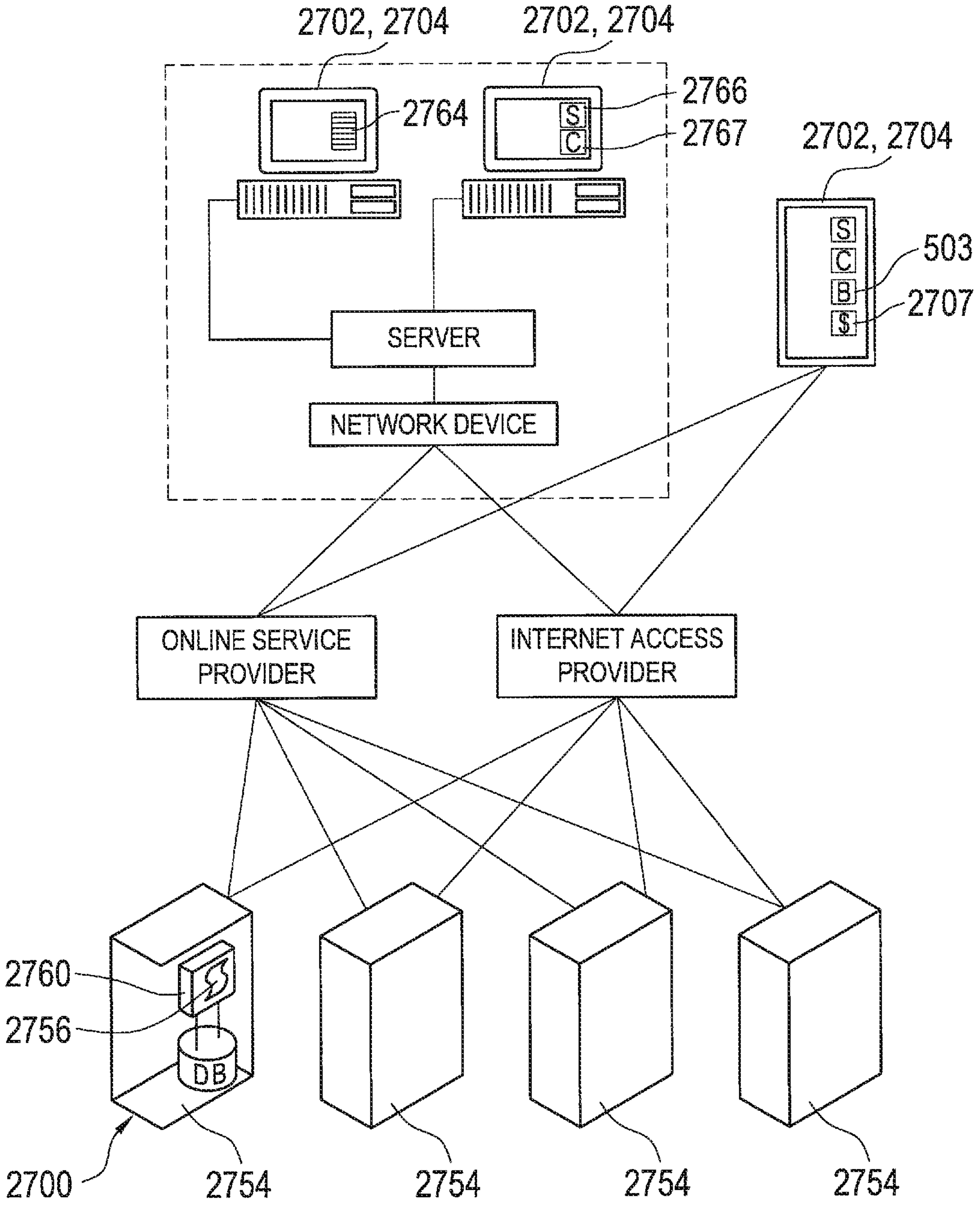
FIG. 27 is a schematic view of the environment in which the system of the invention operating.

The invention exists in a variety of embodiments including at least the following feature sets:

1. Referring to FIG. 27, an online social networking system 2700 including user communication devices 2702, personal computing devices 2704 connected in a network 2710 comprising a server or servers 2754 hosting dedicated control software 2762 of which method steps are executed by a processor 2760 so as to access a database 2762 of user profile data of users to operate the said social networking system, the system, during a registration step, providing the users an opt-in, permission and/or preferences selection device 2764 such as a drop-down menu, enabling users to provide permission (a) to have a recommendation contact engine (a module of the control software 2756) compare and share their user data such as user characteristics and preferences with those of other users for which matches on the compared and sharable user data are determined, and (b) based on matching criteria, to be contacted via the recommendation contact engine, wherein the system 2700 is adapted to identify common or complementary interests between users and to contact users identified thereby as having common interests, inviting such users to a meeting, the system further adapted to propose times and/or locations for such suggested meetings, and to register user-indicated-suitable-dates for such meeting based on decision criteria, and wherein, once an engagement such as a virtual or physical face to face meeting between two recommended users is commenced, the system 2700 is adapted to provide engaging users with a user communication device 2702 such as a display 2766 adapted to indicate to the users what the matching user characteristics are, thereby facilitating identification of common interests between users during an engagement between users.

2. The social networking system of feature set 1, selected from one of a group of social networks consisting of FACEBOOK®, "LINKEDIN"® or "XING"™, "MEETUP"™ and "GOOGLEPLUS"®, "FREINDER", "INTERNATIONS", and dating service networks.
3. The social networking system of feature set 1 wherein the user communication device is a personal computing device such as a smart phone on which a specialized application operates to display matching characteristics.
4. The social networking system of feature set 1, wherein decision selection means is provided to users to limit the users with whom a user can be matched based on the system's knowledge of their location and their physical proximity to a searching user, enabling the searching user to organize and participate in a networking event during which the user can meet those users in their geographical area.
5. A disposition system in combination with the social networking system of feature set 1, the disposition system comprising disposition devices such as seating or standing supports and/or counter/table arrangements adapted to dispose at least two users face to face, a guiding system guiding relative movement of at least one user of the at least two users to place the at least one user so as to successively face one of the at least one remaining users for a desired time period, wherein transport of a user is controlled by a controller, and wherein the controller reads inputs of presence or weight sensors associated with the at least one seat(s) or standing support(s) and/or counter/table arrangement(s) to ensure that users disposed on the fixed and translatable seat(s) or standing support(s) and/or counter/table arrangement(s) are matched with each other for a time period.
6. The disposition system of the above feature set, wherein the sensed weight or sensed presence of a user involved in an engagement is registered in association with a particular engagement, thereby enabling identification of the user for further actions.
7. The disposition system of feature sets 5 or 6, wherein, the weight is sensed by a scale attached to a cord that passes from a first attachment area below the seat or standing support area to an opposing area.
8. The disposition system of any one of feature sets 6-7 including a user communication device which an user disposed on the device can choose to command the controller to avoid further contact with the user with whom they have been matched, such command continuing until the presence detector detects that the user has lifted off the seat or standing support.
9. The disposition system of any one of the feature sets 5-8 including a slip clutch to prevent movement when a jam occurs.
10. The disposition system of any one of feature sets 5-9 including privacy baffles between seats or standing supports which minimize distractions and so focus the attention of matched users.
11. The disposition system of feature set 5, wherein the guiding system is activated by a motor.
12. The disposition system of feature set 5, wherein the guiding system is activated by a gear motor and rack and pinion gear arrangement.
13. The disposition system of feature set 5, wherein the guiding system is activated by hand, such as by rotating a wheel or by a push or pull handle.
14. The disposition system of feature set 5, wherein the guiding system is a conveyor arrangement.
15. The disposition system of the above feature set, wherein the conveyor arrangement is a closed loop.
16. The disposition system of the above feature set, wherein the closed loop is of any serpentine form.
17. The disposition system of feature set 5, wherein the guiding system comprises at least one rotating table.
18. The disposition system of the above feature set, wherein rotating table is formed as a ring.
19. The disposition system of feature set 5, having a round couch disposed on a rotating platform.
20. The disposition system of feature set 5, wherein the desired time period is a set time period, at the end of said set time period, translation or relative motion is initiated to place users in another facing relationship.
21. The disposition system of the above feature set, wherein a computer processor initiates relative motion to place users in the facing relationship.
22. The disposition system of feature set 14, wherein a refreshment or food conveyor system conveys refreshments or food to users disposed on the disposition system.
23. The disposition system of the above feature set, wherein sensors in the conveyor system registers the lifting of drinks or food taken from the conveyor system for billing purposes.
24. The disposition system of the above feature set, wherein a relative location sensor, relative to adjacent users on the disposition system is determined to properly attribute the taken drinks or food for billing purposes.
25. The disposition system of feature set 5, wherein possible snag or pinch points in the system are reduced or eliminated.

26. The disposition system of feature set 5, wherein a safety switch prevents movement of the guiding system when users are being disposed on or who leave the system.
27. The disposition system of feature set 5, including a payment system for taking payment from users who wish to be disposed on the system, who wish to remain on the system for a longer term, or who which to be matched in a desired way.
28. A social media enabled cafésuitable for putting users of similar interest in contact, the café, working with a recommendation engine, uses the disposition system of any one of feature sets 5 to 27, to put people with similar interests in contact in a fair and orderly way, minimizing annoyances of attempted monopolization (or harassment) by pushy users.
29. The social media enabled café of feature set 28, wherein the café has at least one meeting area adapted to serve walk-in visitors who are not online registered users through integrated routines selectable at the device thereby serving those who wish to use the system in an impromptu manner.
30. The social media enabled café of feature set 29, wherein, using the disposition system, the café provides each user the opportunity to meet other users as an aid for a user to decide whether to allow the other user into their network or friends and family circle, thereby helping avoid abuse of the network.
31. A controller 2760 which controls the transport of users to establish alternating facing relationships for a time period, the controller being fed with detected inputs from a presence detector 1502, 1602 indicating the presence of users disposed on fixed and translatable seat(s) or standing support(s) and/or counter/table arrangement(s), to match those users detected to at least another user in a prescribed way.
32. The controller of the above feature set in which matches are made randomly, or consecutively according to programmed inputs.
33. The controller of feature set 31, wherein the matches are made to match men to women or vice versa.
34. The controller of feature set 31, wherein the matches are made to match employers to candidate employees or head hunters and vice versa.
35. The controller of feature set 31, wherein the matches are made to match investors to entrepreneurs and vice versa.
36. The controller of feature set 31, wherein the matches are made between students and teachers for testing purposes, such as oral examinations, thereby enabling review of student's oral knowledge by one or more teachers and enabling a grading system in which each teacher can register a grade for the performance of each student.
37. The controller of feature set 31, wherein the matches are made between hostile users under controlled conditions to facilitate communication and understanding with a view to resolving disputes.
38. The controller of feature set 31, wherein the matches are made between managers of companies considering merger, to facilitate understanding of the needs and wishes of the managers.
39. The controller of feature set 31, wherein input means such as a selection push button 503 allows users who dispose themselves on the device to be matched to input at least one of a group of characteristics consisting of gender, age, sexual orientation, profession, employment status, interests, and purpose in being matched.
40. The controller of feature set 31, wherein the characteristics input are of the disposed users and/or of those with whom they would prefer to be matched.
41. The controller of feature set 31, wherein when only users on at least one of the translatable or the fixed seat or standing support are detected, the controller does not start a matching routine because no matches are possible.
42. The controller of the above feature set, wherein, because no match is possible, the controller starts a waiting routine, which optionally slowly translates a translatable seat(s) or standing support(s) and/or counter/table arrangement(s).
43. The controller of feature set 31, wherein, when presence detection 1502, 1602 indicates a match can be made, such as at least one user disposed on a fixed seat(s) or standing support(s) and/or counter/table arrangement(s), and at least one on a translatable seat(s) or standing support(s) and/or counter/table arrangement(s), the controller initiates translation to make the match.
44. The controller of feature set 31, wherein a warning light 513, such as a red light, indicates when it is not safe to take a seat or dispose a user on the translatable seat(s) or standing support(s) and/or counter/table arrangement(s).
45. The controller 2760 of feature set 31, wherein the time period of engagement is counted down on a display 2766 visible to the users.
46. The controller of feature set 31, wherein the controller receives inputs from the users indicating a desire to be matched again, or not, with another user, at least for the duration of the detected presence of the another user.
47. The controller of feature set 31, wherein presence is detected and seating or standing is suggested via, for example, a light or sound indication, in order to achieve an even distribution of weight on the translatable seat(s) or standing support(s) and/or counter/table arrangement(s).
48. The controller of any of the above feature sets 31 to 47, wherein a payment device 2707 allows users to pay to make another match with a desired user.
49. The controller of the above feature set, wherein the controller assumes that a desired user is still present when their non-presence has not be registered, such non-presence being registered by the presence detector 1502, 1602, indicating an interruption in presence such as the desired user lifting out of their seat or leaving the standing support.
50. The controller of any of the above feature sets 31-49 in which, depending on the number of input users and their interests, seating or standing or standing support locations are suggested by, for example, color lighting.
51. A bar or restaurant or conference center having at least one device of feature set 5 to 27, wherein each device 10, 500, 600, 700, 800, 900, 1000, 1100, 1400, 1600, 1800, 1900, 2300 is themed (i.e., via color—pink or blue—and/or textual markings) as selected from one of the group of themes consisting of dating, friendship, business contacts, networking, employment, over 30 dating, over 40 dating, under 30 dating, and under 40 dating.
52. A method of matching registered users and displaying their common interests, the method operating via software code 2703 executing software instructions on a processor 2760 to receive inputs of users, store input data in a retrievable manner on a database 2762 and to display to the user information which enables the user to identify other users and their characteristics in order to organize meetings with other users, the method including the steps of:

a) registering unique user profiles including characteristics such as age, sex, city of residence, hobbies, etc. in a user database 2762, optionally including ascertaining from other users characteristics of users that the users consider of interest to them such that they may be willing to connect with them;

b) obtaining permissions from users to compare registered user profiles and to suggest connections with those who meet criteria for user connection; and optionally obtaining permissions from the users of what can be revealed to other user having similar characteristics;

c) Referring to FIG. 31, over time and in the background, comparing user profiles 3102 by comparing profile inputs 3104 and/or user input characteristics 3207 of users sought for connection for which permissions for comparing has been granted;

d) indexing users according to match criteria such as according to answers to registration questionnaire questions, for example, age range, race, education level, profession, etc. found in the comparison by assigning an index number or most frequent match identifier classification code to users having corresponding matching characteristics, thereby categorizing users via the indexing into sub-communities of users having common or complementary shared profile information;

e) suggest connections between members so categorized in step d, optionally providing a user with a search window 2766 allowing searching of users based on location of users including enabling searching in a generic or confidential manner by not revealing names of those having characteristics including further at least an option of brokering a face-to-face or virtual meeting with the suggested connections of at least some users;

f) where a brokered meeting of at least some users is selected, sending a meeting request between such users who've, by their selection or by a profile setting, permitted brokered meetings, soliciting input and/or agreement on possible meeting times, dates, places, etc.;

g) repeating the above step until decision criteria determines agreement between suggested connections on time and place;

h) sending out reminders, optionally with an vCalendar Format (*.vcs) electronic calendar file, requesting RSVPs to such brokered meetings, optionally including coordinating with meeting locales such as bars or restaurants or amusements to ensure space availability;

i) during the meeting displaying via a user communication device to each matched user the other user's matching criteria for which permission for comparison and display was given by the user; and j) after the meeting, soliciting ratings for each connection, including providing the option of connecting with the attendees online.

53. The method of feature set 52, wherein after step h, during the meeting, participating users are at least initially limited to a predetermined amount of time of face to face contact with the other users, with each user receiving a turn at the face to face contact, thereby ensuring fair and orderly introductions between users.

54. The method described in any of the above method feature sets, wherein the place of the meeting includes infrastructure which enables the use of the networking software of the invention onsite.

55. The method of the above feature set, wherein a transceiver is worn by members, the transceiver at least emitting and preferably also receiving the code of the community, optionally emitting the code readable by a RFID-enabled lock on an entrance to a restricted area which unlocks upon reading of the code to allow a code member to enter the restricted area reserved for members with the code.

56. The method of one of feature sets 54 or 55, wherein the face-to-face contact, optionally with the networking roundtable of the invention, takes place in a room whose walls are at least partially, preferably completely covered with a video panels adapted to display images or videos selected by the organizer of the event, a host meeting locale manager and/or the event sponsor, to create an immersive environment therein keyed to the common interests of the community.

57. The method of the above feature set, in which, at the place of the meeting and optionally during the time of the brokered meeting, the method provides an unlock code that is optionally specific to the place of the brokered meeting, such unlock code being provided at a specific time period during operation of the networking roundtable, or only after a certain number of connections are made, the unlock code unlocks a feature of the software which enables connection via a smartphone or tablet with selected users of interest who signed up to the brokered meeting.

58. The method of feature set 57, wherein further, depending on the requirements set for unlocking, a unlock sequence or requirement can be found that encourages attendance at the brokered meeting and/or enables those who attend a brokered meeting and optionally, those who use the software or the networking roundtable of the invention at the place of meeting during the networking time period to connect to each other using the software of the invention in order to ensure fair introductions before being permitted to get to know the invitees.

59. The method of feature set 52, wherein the code is promoted within that community, wherein promotional materials such as T-shirts, sunglasses, bags and other items are branded with the code and made available to members of that particular community.

60. The method of feature set 57, further including a radio transceiver carried or worn by a member user that transmits and receives the code, wherein an alarm indicates whether another community member is within a certain area.

61. The method of feature set 60, wherein further, the transceiver further includes communication means which, when activated such as via contact with another transceiver, contact details are shared between the users associated with each transceiver, independently of whether the users match the criteria of a community that one or the other is a member of.

62. The method of the above method feature sets, wherein a directional indicator device is integrated in the transceiver to help the two members make an encounter.

63. The method of feature set 52, optionally using a MTDB, wherein each user may run a search on the database 2762 to find matches, and is provided with a save results feature, saving the results in association with a community website under a particular community name or code, the code being unique and saved in a column of the database associated with each user, thereby allowing the users to solicit a meeting or meetings among the users found in the search, such users being considered, for the sake of the creating user, members of the community.
64. The method of the above feature set, wherein the community name or code is made known to the members and members of the community so formed being provided with means to run searches on the community optionally limited to a particular location, and thereby be able to set up meetings at any desired location.
65. Referring to FIG. 33, the method of any of the above method feature sets, wherein a sponsor module 3300 seeks sponsors offering products and/or services targeting members of a community having interests which match the codes, and, assuming the size of any brokered meeting is of interest to potential sponsors, a sponsor or sponsors indicating their interest and who contracts with the purveyors of the system to sponsor the meeting is provided with sponsoring options selected from at least one of the group of sponsoring options consisting of:
    a) providing custom sponsor banners online on the website of the community for which the code is associated, for a period of time where the meeting is memorialized online for a specified amount of time or number of visitors, and
    b) providing a brokered meeting organizer and/or a meeting host location manager with custom sponsor banners, sponsor videos and/or promotional items (such as T-shirts, mugs, pens) for delivery to the place of meeting prior to the meeting or for display on display devices 2802 in the premises at which the brokered meeting is to take place.
66. The method of the above feature set, wherein the video devices 2802 are video panels that cover at least a substantial portion of the walls and/or ceiling of a room at the place at which the brokered meeting is to take place.
67. The method of one of feature sets 65, wherein, in step b, the users displaying the banner or distributing the promotional items optionally do so together with a code on the banner or promotional item enabling the locale or place of meeting to receive payment on behalf of the sponsor for a determined percentage of the costs of the meeting, including optionally the cost of the first drink, or a percentage of all drinks purchased such that the locale or place of meeting can offer a special price such as a happy hour price (for example, a taxi company can offer discounted taxi services to return the participants to their homes), the code optionally being readable via a barcode by a bar code reader typically an application running on a mobile device such as a smart phone of the user, for example, by users who attend the meeting, the larger the number of users who scan the code which is registered on the system as proof of attendance, the more the sponsor pays for such sponsoring opportunity.
68. The method of any of the above method feature sets, wherein the codes or corresponding names representing these communities are published embodied in a wearable item, such as on clothing items selected from at least one of the group of clothing items consisting of watches, wrist bands, headbands, T-shirts, shirts, sunglasses, baseball caps, wherein, where the code is not converted into a corresponding name that is descriptive, the nature of the community remains unknown to non-members of the community, thereby allowing users who are members of the community to inconspicuously brand themselves so that they are identifiable essentially only by other members of the community.
69. The method of the above feature set, wherein the wearable items include a transponder and/or receiver 2902 (for example, integrated into a watch) adapted to emit and/or respectively receive the code at least by other members of the community, over a given distance range, thereby enabling impromptu contact between members.
70. A wearable transceiver 2902 for use with the method of the above method feature sets, the transceiver having a receiver 2904, a transmitter 2906, a processor 2908, and a power source 2910 functionally connected so as to emit and receive a code, the transceiver 2902 adapted to be worn by a member of the community having the code associated therewith, the transceiver, in operation, scanning a region within its scanning range for the presence of another transceiver 2902' emitting the code, the reception of the code from another transmitter informing the member of the proximity of another member.
71. The wearable transceiver 2902 of the above feature set, further including a direction indicator device 2912 having a pointer 2914 which, in operation, upon detecting another transceiver transmitting the code of the community, indicates the relative direction which the wearer must travel to approach the transceiver 2902 for the purpose of making contact with the wearer of the transmitter.
72. The wearable transceiver 2902 of the above feature set, wherein further, the transceiver emits further code information enabling users to better ascertain whether to make the impromptu contact, such further code information selected from at least one of a group of further characteristics consisting of gender, marital status, age range and whether there is a compatible sexual orientation
73. The method of any of feature sets 67-72, wherein, when a user is interested in contacting another user wearing an item 3000 displaying the community code 3002, the first user connects to a network 2700 having access to a portal associated with all communities and, typically via a URL to the community search input field 2767, search the communities for that particular community, and seek to join that community.
74. The method of the above feature set, wherein the user seeking admittance to the community is subjected to a questionnaire allowing the community to ascertain whether the user seeking admittance is compatible with the community and if so, provides a means for the seeking person to join the community.
75. The method of the above feature sets 73 or 74, the code further annotated with a user identifier, allowing identification of the individual user.
76. The method of any of the above method feature sets, further including the step of charging a fee for searching for access in a given community.
77. The method of the above feature set, wherein, a fee is charged proportional to any stated wealth of the user, thereby creating a financial barrier to membership which tends to exclude the user from a community that requires of its members to state their wealth at a mimimum amount thereby avoiding fraud in the declaration of stated wealth.

78. Referring to FIG. 32, a community-making engine 3200 operating together with user communication devices 2702, personal computing devices connected in a network 2700 comprising a server or servers 2754 hosting dedicated control software 2703 of which method steps are executed by a processor 2760 so as to access a database 2762 of user profile data of users to operate a social networking system 2700, the system, during a registration step, providing the users an opt-in, permission and/or preferences selection device such as a drop-down menu 2764 enabling users to provide permission to be contacted and to share their user data such as user characteristics and preferences with those of other users for which matches on the compared and sharable user data are determined, wherein the community-making engine 3200 operates on the database 2762 of user profiles, permissions and preferences, over time and in the background to:
   a) compare user profiles by comparing profile inputs for which comparison permission has been granted such as age, sex, city of residence, hobbies, etc. and/or user input characteristics of types of users sought for connection;
   b) index based on most frequent, useful match criteria found in the comparison by assigning an index number or most frequent match identifier classification (hereinafter "code") to each matching criteria, such as, for example, age range, race, education level, profession, etc., which are typically gathered at registration of the user, thereby categorizing users via the indexing into sub-communities 3302 of users having at least one common profile criteria;
   c) define communities based on at least one, preferably at least two common match criteria, comprising at least a certain minimum number of users;
   d) for at least the purpose of connecting users sharing common interests, suggest connections between users optionally based on location of users including in a generic or confidential manner and optionally brokering face to face meetings between users;
   e) during a controlled engagement between users, display common characteristics for which display permission was granted; and
   f) optionally following up with those users who have engaged via a brokered meeting face to face, suggest connections and ratings of the engagement.

79. The community-making engine 3200 of feature set 78, in combination with a user-controlled community-making engine executing the method of feature set 63.

80. A rotating chair 2200, the chair's rotation being controlled according to a PCA to face in a programmed direction, the chair optionally including sound gathering means to focus on sound coming from a particular direction, further optionally audio earphones optionally tuned in to the speech coming from a facing chair.

81. The rotating chair 2200 of the above feature set in an array 1900, wherein their location, direction, and rotation is controlled to place users seated therein or standing thereon in face to face contact with another for a period of time which is optionally predetermined by an input time.

82. A presentation arrangement of chairs 1900 and presentation panels 2802 such as video screens wherein the presentation is disposed on at least two wallss, preferably more wallss, typically four walls, and such parts and presented with offset start times typically corresponding to the total time of the entire presentation divided by the number of parts, thereby allowing a long presentation to be played in parts such that persons wishing to view the presentation can enter the room at any time, sit and be automatically directed to the first part, optionally with audio support 2204, and then directed to the second part, and so on, until the presentation is complete, thereby minimizing waiting times to view the presentation.

83. The arrangement of the above feature set wherein users can select their language and listen to the presentation in their language on audio earphones 2204 or in a controlled audio chamber 2202 that minimizes the disruption to adjacent participants.

84. The system of feature set 1, wherein the decision criteria is based on the maximum number of users available on a particular proposed meeting time and date.

85. The system of feature set 1, wherein the decision criteria is the will of a designated meeting host or moderator.

86. The device of feature set 7, wherein the scale is a strain gauge 1520.

87. The device of the above feature set, wherein the strain gauge 1520 is a piezo-electric strain gauge.

88. The system 2700 of feature set 8, wherein the user communication device 2702 is a control integrated into the device selected from one of the group of controls consisting of a button 903, a touch screen console 1820, and a personal computing device 2704 which initiates a desired action.

89. The system of feature set 13, wherein a networking moderator controls the movements of the system.

90. The controller of feature set 45, wherein a time period before initiation of translation/movement is counted down on a user communication device 2702 providing users warning giving them time to change positions or leave the device prior to movement.

91. The method of the feature set 52, wherein further, the place of meeting reserves and makes available the networking roundtable 10, 500, 600, 700, 800, 900, 1000, 1100, 1400, 1600, 1800, 1900, 2300 of the invention, wherein the members seat or otherwise place themselves in the roundtable in facing relationship, and the roundtable turns to alternate the facing relationship, thereby optimally ensuring fair and orderly introductions between users, and to provide matching tools displayed on the user communication device 2702 which, based on matches, suggests themes for discussion.

Figure 34B:
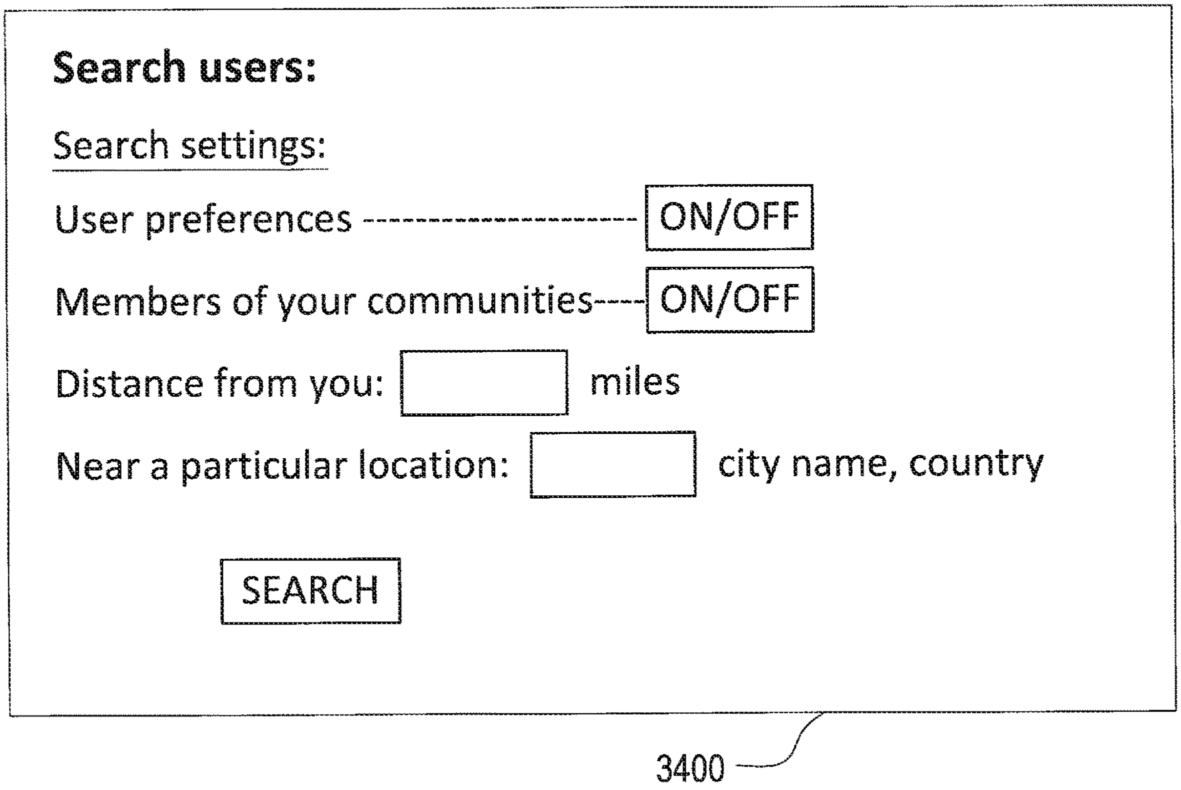

93. Referring to FIGS. 34A and 34B, the system of feature set 7, in which the attachment areas are armrests 1506.

94. The social media enabled café of feature set 28, wherein the café has at least one meeting area adapted to serve online registered users invited to an event by the recommendation contact engine 3400.

95. A displacement device 2400 wherein the device incorporates a single seat 1902 supported by a housing 190 having locomotion means 1416 together with 2417 allowing controlled and low speed displacement along a flat surface 1904 according to commands of a controller 2432 to direct the displacement device along a path so as to be disposed face to face with another such device or to follow a prescribed path.

96. The displacement device of feature set 95, wherein weight of a user is at least in part supported by, and stability is provided by, a lower, outer ring portion 2442 supported by swivels 2414, wherein chargeable batteries 2404 are mounted therein which provide sufficient power to locomote the device via an onboard motor 2417 (connected through slip ring 2440).

97. The device of feature sets 95 or 96, wherein the device 2400 is propelled by two wheels or two sets of wheels 2416 rotatable along a common axis 2417 which are frictionally engageable with the flat surface, forward motion being obtained by powering the wheels in the same direction of rotation, turning being obtained by powering one wheel in rotation more than another or in an opposite rotational direction and reverse motion being obtained by reversing the wheels.

98. The device of any one of feature sets 95 to 97, wherein the propelled wheels 2416 are only engageable with the flat surface 1904 when sufficient weight is placed on the seat, such as via support by a spring 2420 between the housing 1903 and the outer ring portion 2442, thereby providing a default, unloaded disengaged state when no user is disposed on the device.

99. The device of any one of feature sets 96, wherein propelled wheels extend beyond a lower most end of the outer ring portion 2442 so as to be engageable with the flat surface through the outer ring portion, the outer ring portion substantially supporting only its own weight.

100. Use of the device of any one of feature sets 95-99 in combination with a programmed controller 2432 which is adapted to control driving of the device along a route on the flat surface 1904 when a user is disposed thereon.

101. The device of the above feature set, wherein the user disposed on the device is provided with a pause control 2433 which interrupts translation along the prescribed route for a period of time.

102. The device of any one of the feature sets 95-101, wherein the device is used by museums or exhibitors to move users through the exhibits in a controlled manner.

103. The device of the above feature set, wherein a collision avoidance device includes at least three proximity sensors 2411 to avoid collisions between devices 2400.

104. The device of any one of the feature sets 95-103, wherein the controller is a remote control device 2432 which is operable by the user seated in or standingly disposed on the device.

In an advantage, the invention combines virtual reality with a physical reality, facilitating getting to know one another online first, if desired. In any case, the face to face contact is made using the app and/or the physical embodiment of the invention and encourages contact with persons who are also physically proximate to one another, thereby better ensuring lasting personal connections and enabling off-line contact.

In another advantage, the invention presents at its core a means of bringing people of similar interests together face to face.

In another advantage, the invention facilitates the building of more meaningful relationships among people of like interests.

In an advantage, the invention facilitates networking in a manner which reduces awkward situations and provides discipline and efficiency in facilitating contact with a plurality of users.

In another advantage, the invention evens the playing field by putting shy persons, approximately 50% of the world's population, on the same footing with extroverted, imposing or outgoing persons when it comes to making the initial contact with strangers.

In another advantage, the invention makes contact with others efficient by limiting the initial contact to a prescribed time period and providing multiple opportunities for contact.

In another advantage, the invention challenges the memory of the participants because they will soon be placed in front of others with whom they must continue a conversation that was broken off by the system's movement. Fortunately, the console of the invention displays the name and points of common interest, as an aid to continue the conversation.

In an advantage, advertisers may then target members having the criteria that they specify.

In an advantage, the system and method of the invention provides a quick and less resource intensive searching of a large number of users by eliminating the need to search all registered members which may be a number as high as a billion persons. Instead, the search criteria is analyzed, and searching is limited to those whose codes or communities are already known to include one or more of the characteristics sought. If there is an exact match, then the searching member may be introduced to an existing community.

In another advantage, the codes can be published, and users can use the codes on T-Shirts or other clothing articles to make clear that they are members of this community. For example, a T-Shirt with "1234" expresses a certain commitment to this community and allows others to readily identify themselves, even confidentially, because only members of the community represented on the clothing need to know what the code implies. Consequently, members can inconspicuously brand themselves so that they are identifiable by other members of the community. Other synergistic inventions such as wearable radio transponders that emit the code such that others who have a receiver in their proximity may be warned via a signal, even a directional indicator pointing to the other member, of the presence of someone who shares certain common interests with the member. Such a feature would make it very easy indeed for persons of common interests to meet spontaneously at sporting events or other public events for example.

In an advantage, where a person sees another with a certain code, they may note the code and go online, seeking membership in that community. A questionnaire that must be answered correctly filters access to the community. The answers provided by the candidate member must be correct in order for that person to gain more information or seek membership in that community. The certain code may have a tag or add-on code that further identifies the user, so that if the person who sees the user wishes to contact that person, if they answer the questions correctly, they may be directed to a means of contacting that person in particular.

In an advantage, the system of the invention creates new markets for clothing or other items which may include the code or community identifier.

As will be appreciated by skilled artisans, the present invention may be embodied as a system, a device, or a method.

Moreover, the system contemplates the use, sale and/or distribution of any goods, services or information having similar functionality described herein.

The specification and figures should be considered in an illustrative manner, rather than a restrictive one and all modifications described herein are intended to be included within the scope of the invention claimed. Accordingly, the scope of the invention should be determined by the appended claims (as they currently exist or as later amended or added, and their legal equivalents) rather than by merely the examples described above. Steps recited in any method or process claims, unless otherwise expressly stated, may be executed in any order and are not limited to the specific order presented in any claim. Further, the elements and/or components recited in apparatus claims may be assembled or otherwise functionally configured in a variety of permutations to produce substantially the same result as the present invention. Consequently, the invention should not be interpreted as being limited to the specific configuration recited in the claims.

Benefits, other advantages and solutions mentioned herein are not to be construed as critical, required or essential features or components of any or all the claims.

As used herein, the terms “comprises”, “comprising”, or variations thereof, are intended to refer to a non-exclusive listing of elements, such that any apparatus, process, method, article, or composition of the invention that comprises a list of elements, that does not include only those elements recited, but may also include other elements described in the instant specification. Unless otherwise explicitly stated, the use of the term “consisting” or “consisting of” or “consisting essentially of” is not intended to limit the scope of the invention to the enumerated elements named thereafter, unless otherwise indicated. Other combinations and/or modifications of the above-described elements, materials or structures used in the practice of the present invention may be varied or adapted by the skilled artisan to other designs without departing from the general principles of the invention.

The patents and articles mentioned above are hereby incorporated by reference herein, unless otherwise noted, to the extent that the same are not inconsistent with this disclosure.

Other characteristics and modes of execution of the invention are described in the appended claims.

Further, the invention should be considered as comprising all possible combinations of every feature described in the instant specification, appended claims, and/or drawing figures which may be considered new, inventive and industrially applicable.

Copyright may be owned by the Applicant(s) or their assignee and, with respect to express Licensees to third parties of the rights defined in one or more claims herein, no implied license is granted herein to use the invention as defined in the remaining claims. Further, vis-A-vis the public or third parties, no express or implied license is granted to prepare derivative works based on this patent specification.

Multiple variations and modifications are possible in the embodiments of the invention described here. For instance, it is contemplated that a software app be provided which mimics the function of the invention in that participants who are screened for common interests are invited to spend a desired (preferably set) amount of time with each participant and the app then connects the participants successively with one another giving each participant a set amount of face time with each other. After this set time, the existing chat or connection is broken off and a new connection is established.

Although certain illustrative embodiments of the invention have been shown and described here, a wide range of changes, modifications, and substitutions is contemplated in the foregoing disclosure. While the above description contains many specific details, these should not be construed as limitations on the scope of the invention, but rather exemplify one or another preferred embodiment thereof. In some instances, some features of the present invention may be employed without a corresponding use of the other features. Accordingly, it is appropriate that the foregoing description be construed broadly and understood as being illustrative only, the spirit and scope of the invention being limited only by the claims which ultimately issue in this application.

What is claimed is:

1. A disposition system comprising disposition devices such as seating or standing supports and/or counter/table arrangements adapted to dispose at least two persons on the disposition system face to face, a guiding system guiding relative movement of at least one person of the at least two persons to place the at least one person selectively face to face with one of the at least one remaining persons for a desired time period, a computer processor adapted to read inputs indicating presence or weight of persons associated with the at least one seat(s) or standing support(s) and/or counter/table arrangement(s) disposed on the disposition device, wherein transport of a person disposed thereon is controlled by the computer processor, and wherein the computer processor reads said inputs indicating presence or weight to ensure that persons disposed thereon are matched with each other for a time period.

2. The disposition system of claim 1, wherein the indicated inputs of weight or presence of a person are read by sensors and stored in association with a particular engagement, thereby enabling the computer processor to avoid a second engagement of the same user persons.

3. The disposition system of claim 2 including a user communication device which a first person disposed on the device can activate in a manner that commands the computer processor to avoid further matching with a second person with whom they have been matched by avoiding that a seat loaded with essentially the same sensed weight be matched with the first user person, such command continuing until the presence detector detects that the seat loaded with essentially the same weight to be excluded has lifted off the seat or standing support.

4. The disposition system of claim 1 including privacy baffles between seats or standing supports which minimize distractions and so focus the attention of matched persons.

5. The disposition system of claim 1, wherein the guiding system is activated by a motor.

6. The disposition system of claim 1, wherein the guiding system is activated by a gear motor and rack and pinion gear arrangement.

7. The disposition system of claim 1, wherein the guiding system is selected from one of the group of guiding systems consisting of a conveyor arrangement and a rotating platform.

8. The disposition system of claim 7, wherein the conveyor arrangement is a closed loop of any serpentine form.

9. The disposition system of claim 1, wherein the desired time period is a set time period, at the end of said set time period, the computer processor initiates translation or relative motion to place persons in another facing relationship.

10. The disposition system of claim 9, wherein a computer processor initiates relative motion to place persons in the facing relationship.

11. A social media enabled café suitable for putting persons in contact, the café, working with a recommendation engine, uses the disposition system comprising disposition devices such as seating or standing supports and/or counter/table arrangements adapted to dispose at least two persons face to face, a guiding system guiding relative movement of at least one person of the at least two persons to place the at least one person so as to selectively face one of the at least one remaining persons for a desired time period, wherein transport of a person is controlled by a computer processor, and wherein the computer processor reads user-associated inputs from one of the group of user-associated inputs consisting of inputs from a weight sensor in a seat, from a presence sensor in a seat, or person's ID registered to a seat to initiate translation or relative movement to match persons disposed on the fixed and translatable seat(s) or standing support(s) and/or counter/table arrangement(s) with each other for a time period so as to put people in contact in a fair and orderly way.

12. A computer processor which controls a motor to move persons to establish alternating facing relationships for a time period, the computer processor being fed with detected user-associated inputs from one of the group of user associated inputs consisting of inputs from a weight sensor in a seat, from a presence sensor in a seat, or user person's ID registered to a seat disposed on fixed and translatable seat(s) or standing support(s) and/or counter/table arrangement(s), to match those persons detected to at least another person whose presence is detected in a prescribed way.

13. The computer processor of claim 12 in which matches are made randomly, or consecutively according to programmed inputs.

14. The computer processor of claim 12, wherein the matches are made to match one of the group of persons consisting of men to women, employers to candidate employee or head hunters, inventors to entrepreneurs, students to teachers, between disputing groups, between merger partners, hostile persons or vice versa.

15. The computer processor of claim 12, wherein input means such as a selection push button that allows a person to command the controller computer processor to seek matches based on user inputs including one of a group of characteristic inputs consisting of regarding their gender, age, sexual orientation, profession, employment status, interests, and purpose in being matched to allow persons who dispose themselves on the device to be matched based on these user inputs.

16. The computer processor of claim 12, wherein the detected inputs are of the disposed persons and/or of those with whom they would be matched.

17. The computer processor of claim 12, wherein, detected inputs indicate a match can be made, such as at least one person disposed on a fixed seat(s) or standing support(s) and/or counter/table arrangement(s), and at least one on a translatable seat(s) or standing support(s) and/or counter/table arrangement(s), at which time, the computer processor controls a motor to initiates translation to make the match.

18. The computer processor of claim 12, wherein the time period of engagement is counted down on a display connected to the computer processor and visible to the persons.

19. The computer processor of claim 12, wherein when non-presence is registered by the presence indicator after having registered presence, an interruption in presence is indicated when the lifts out of their seat or standing support.

20. A disposition system comprising:

(a) disposition devices such as seating or standing supports and/or counter/table arrangements adapted to dispose at least two persons on the disposition system face to face, (b) a guiding system guiding relative movement of at least one person of the at least two persons to place the at least one person selectively face to face with one of the at least one remaining persons for a desired time period, (c) a motor, and (d) a computer processor adapted to read inputs indicating presence or weight of persons associated with the at least one seat(s) or standing support(s) and/or counter/table arrangement(s) disposed on the disposition device, and drive the motor to initiate translation or relative motion to ensure that persons disposed thereon are matched with each other for a time period.

21. A disposition system comprising (a) disposition devices such as seating or standing supports and/or counter/table arrangements adapted to dispose at least two persons on the disposition system face to face, (b) a guiding system guiding relative movement of at least one person of the at least two persons to place the at least one person selectively face to face with one of the at least one remaining persons for a desired time period, and (c) a controller adapted to read inputs indicating presence or weight of persons associated with the at least one seat(s) or standing support(s) and/or counter/table arrangement(s) disposed on the disposition device, wherein transport of a person disposed thereon is controlled by the controller, and wherein the controller is adapted to read said inputs indicating presence or weight to ensure that persons disposed thereon are matched with each other for a time period, wherein at the end of said time period, the controller is adapted to initiate translation or relative motion to place persons in another facing relationship.

* * * * *